United States Patent
Catovic et al.

(10) Patent No.: US 12,490,217 B2
(45) Date of Patent: Dec. 2, 2025

(54) MULTI-ACCESS PDU SESSIONS FOR MULTI-USIM DEVICES

(71) Applicant: QUALCOMM Incorporated, San Diego, CA (US)

(72) Inventors: Amer Catovic, San Diego, CA (US); Waqar Zia, Munich (DE); Dario Serafino Tonesi, Berlin (DE); Sebastian Speicher, Wallisellen (CH); Ajith Tom Payyappilly, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 737 days.

(21) Appl. No.: 17/454,230

(22) Filed: Nov. 9, 2021

(65) Prior Publication Data
US 2023/0144323 A1     May 11, 2023

(51) Int. Cl.
| | |
|---|---|
| *H04W 48/00* | (2009.01) |
| *H04W 8/20* | (2009.01) |
| *H04W 12/06* | (2021.01) |
| *H04W 60/04* | (2009.01) |
| *H04W 84/04* | (2009.01) |

(52) U.S. Cl.
CPC ............ *H04W 60/04* (2013.01); *H04W 8/20* (2013.01); *H04W 12/068* (2021.01); *H04W 48/17* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2019/0159115 A1* | 5/2019 | Russell | H04L 65/1073 |
| 2019/0394833 A1* | 12/2019 | Talebi Fard | H04W 4/80 |
| 2020/0178196 A1* | 6/2020 | Wang | H04W 76/16 |
| 2021/0227455 A1* | 7/2021 | Aramoto | H04W 28/0289 |
| 2021/0258316 A1* | 8/2021 | Liu | H04L 63/0876 |
| 2022/0191696 A1* | 6/2022 | Yoshizawa | H04L 9/3213 |
| 2022/0232364 A1* | 7/2022 | Tsuda | H04W 8/183 |
| 2022/0248479 A1* | 8/2022 | Yu | H04W 76/20 |

(Continued)

FOREIGN PATENT DOCUMENTS

| | | | | |
|---|---|---|---|---|
| WO | WO2021138784 | * | 7/2021 | H04W 76/16 |

*Primary Examiner* — Abdelillah Elmejjarmi
(74) *Attorney, Agent, or Firm* — Arent Fox, LLP and Qualcomm, Incorporated

(57) ABSTRACT

Aspects are provided which allow an MA PDU session to establish over two 3GPP accesses respectively via different PLMNs associated with respective USIMs of a MUSIM device. During registration, the MUSIM UE may transmit a registration request to a base station of a first PLMN indicating a UE capability for a MA PDU session associated with a MUSIM device. The MA PDU session includes a plurality of PDU sessions associated with a single access type. Afterwards, the UE may transmit a PDU session establishment request for a first PDU session of the PDU sessions in the first PLMN and for a second PDU session of the PDU sessions in a second PLMN, where the first PLMN is associated with a first USIM of the UE, and the second PLMN is associated with a second USIM of the UE. Consequently, MA PDU sessions associated with MUSIM devices may be established.

19 Claims, 9 Drawing Sheets

(56) References Cited

U.S. PATENT DOCUMENTS

| | | | |
|---|---|---|---|
| 2022/0264506 A1* | 8/2022 | Kiss | H04W 60/00 |
| 2022/0361132 A1* | 11/2022 | Gurumoorthy | H04W 60/005 |
| 2023/0045765 A1* | 2/2023 | Youn | H04W 60/005 |

* cited by examiner

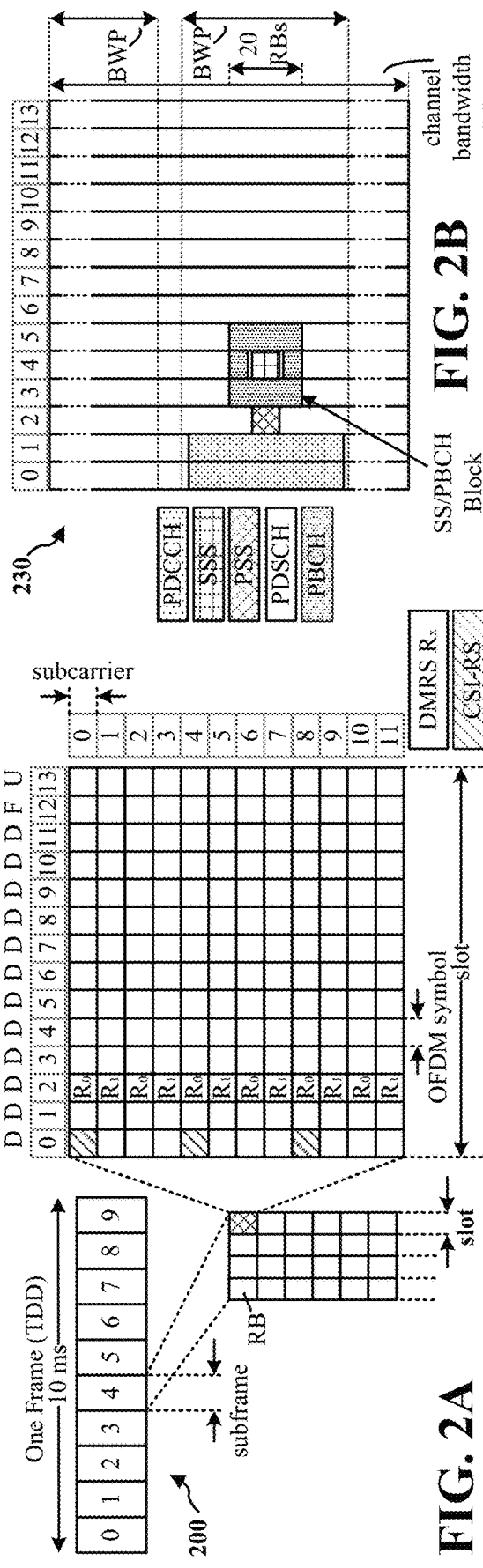
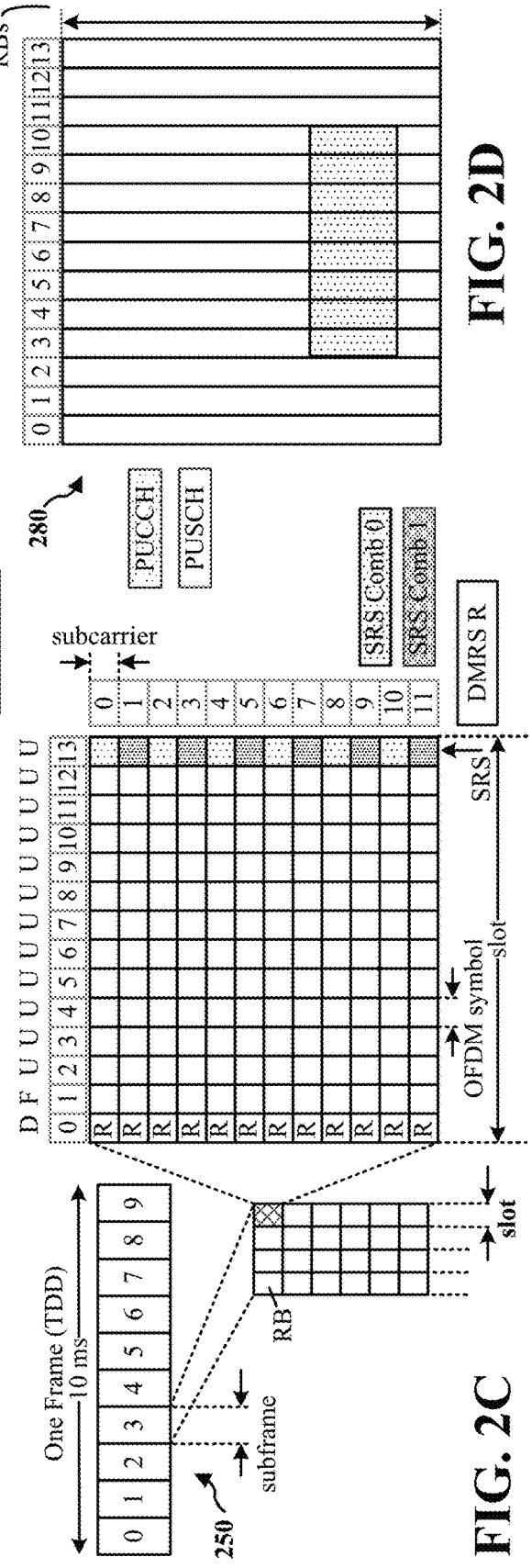
FIG. 2A
FIG. 2B
FIG. 2C
FIG. 2D

MULTI-ACCESS PDU SESSIONS FOR MULTI-USIM DEVICES

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE transmits a registration request to a base station of a first public land mobile network (PLMN). The registration request indicates a UE capability for a multi-access protocol data unit (MA PDU) session associated with a multiple universal subscriber identity module (MUSIM) device. The MA PDU session includes a plurality of PDU sessions associated with a single access type. The UE also transmits a PDU session establishment request for a first PDU session of the PDU sessions in the first PLMN and for a second PDU session of the PDU sessions in a second PLMN. The first PLMN is associated with a first universal subscriber identity module (USIM) of the UE, and the second PLMN is associated with a second USIM of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
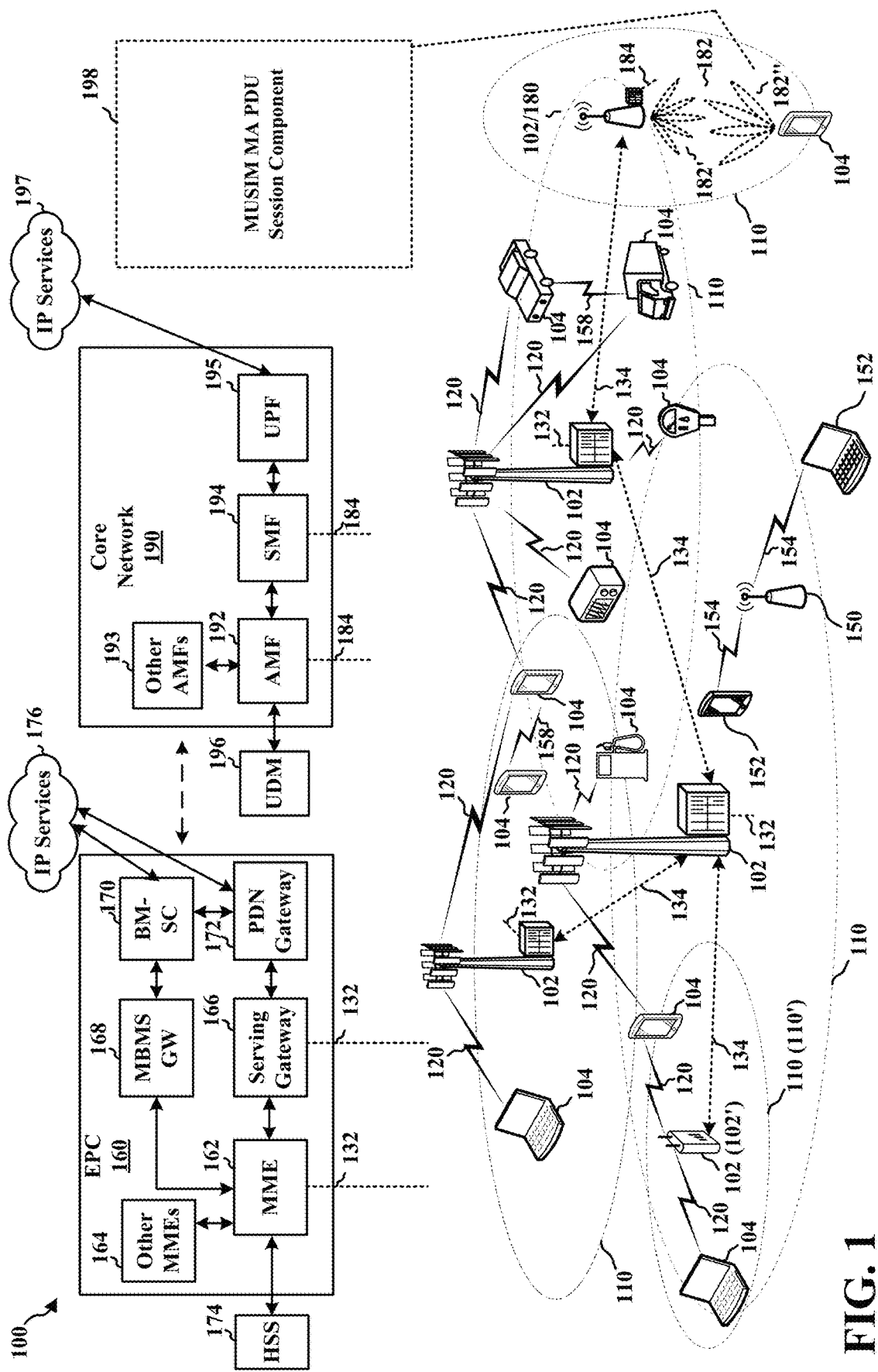
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A mobile device (e.g., a UE) may include multiple universal subscriber identity modules (USIMs). Such devices, also known as multi-USIM or MUSIM devices, are capable of maintaining a separate registration state with a PLMN for each USIM at least over Third Generation Partnership Project (3GPP) Access (e.g., cellular access [New Radio access or Evolved Universal Terrestrial Radio Access] or satellite access). For example, a MUSIM UE including two USIMs may initiate and maintain a separate registration state with a PLMN for each USIM, over 3GPP access, using separate identities (e.g., a mobile subscriber identity) and separate credentials (e.g., a set of encryption keys) associated with those USIMs. Each USIM may be associated with a same PLMN (e.g., a same home PLMN), or with different PLMNs (e.g., different home PLMNs). For instance, each USIM may store a unique mobile subscriber identity including or derived from the same PLMN identity or a different PLMN identity. In some cases (for different PLMNs), one of the PLMNs may be a home PLMN, and the other PLMN may be a visiting PLMN. Moreover, the USIMs of a MUSIM device may not necessarily be physical USIMs (e.g., physical chips), but may be logical USIMs, or a combination of physical and logical USIMs.

Generally, a UE may support ATSSS. ATSSS allows the UE to establish a multi-access protocol data unit (PDU) session (a MA PDU session) with one or more base stations (e.g., in a same PLMN or in different PLMNs), within which PDU session the UE may communicate with the base station(s) simultaneously over a 3GPP access network and over a non-3GPP access network (e.g., a wireless local area network (WLAN) incorporating Wi-Fi), or alternatively over one of these access networks at a time. Currently, ATSSS applies to MA PDU sessions involving 3GPP and non-3GPP accesses, including MA PDU sessions where the 3GPP access connects to an Evolved Packet Core (EPC) and the non-3GPP access connects to a 5G Core. The UE may be registered to the same PLMN or to a different PLMN over each access, or in cases where the 3GPP access connects to an EPC and the non-3GPP access connects to a 5GC, the UE registers to the same PLMN over each access. The UE may also apply the same identity and credentials stored in a USIM for each registration. However, the UE may not currently establish MA PDU sessions involving two 3GPP accesses with different PLMNs.

Although these current limitations of ATSSS do not significantly impact UEs with a single USIM (e.g., for 3GPP access) and radio capability (e.g., for non-3GPP access), MUSIM devices on the other hand typically have dual USIMs and dual radio capability. Moreover, unlike single USIM devices, MUSIM devices may maintain separate registration states over 3GPP access with a same or different PLMNs using different identities and credentials. Currently while operating in these registration states, a MUSIM device may establish parallel, separate, single access PDU sessions over two 3GPP accesses with different PLMNs (e.g., with different base stations of different networks) in order to receive and transmit data individually in each network. However, the MUSIM device may not perform ATSSS or otherwise concurrently access the PLMNs over these cellular networks, since there is currently no support for MA PDU sessions over two 3GPP accesses with different PLMNs. Without the aforementioned support, MUSIM devices may not presently benefit from the robust connection and diversity provided by MA PDU sessions with different PLMNs, which sessions allow for concurrent (and individual) network access, adjusting to varying Quality of Service (QoS) constraints, and ATSSS capability, in contrast to single access PDU sessions. Therefore, it would be helpful for networks to provide support for MA PDU sessions over two 3GPP accesses respectively with different PLMNs associated with different USIMs of a MUSIM device, in order to allow such devices to benefit from the concurrent network access, adaptability to varying QoS constraints, ATSSS capability, and other features currently available in MA PDU sessions for single USIM devices.

Accordingly, aspects of the present disclosure provide a system to establish an MA PDU session over two 3GPP accesses respectively via different PLMNs associated with respective USIMs of a MUSIM device. In one aspect, during a registration procedure with a PLMN (e.g., PLMN A) at a NAS protocol layer, the MUSIM UE may provide a capability indication to the network indicating device support for these MA PDU sessions over 3GPP access with different PLMNs. In another aspect, after the MUSIM device provides a registration request message to a PLMN (e.g., PLMN A), the base station in the PLMN may similarly respond with a capability indication to the UE indicating network support for these MA PDU sessions over 3GPP access with different PLMNs. In a further aspect, after the base station in the registered PLMN (e.g., PLMN A) accepts registration with the MUSIM UE and determines the UE supports MA PDU sessions over 3GPP access with different PLMNs, the base station may provision the UE with a list of other PLMNs which similarly support these MA PDU sessions. After the MUSIM UE registers with the PLMNs supporting MA PDU sessions associated with MUSIM devices, the UE may select one of these PLMNs to be an anchor PLMN for the MA PDU session. The UE may then establish a MA PDU session over the PLMN which the UE selected as the anchor PLMN. Subsequently, the UE and base station may communicate uplink and downlink data within the MA PDU session over the two 3GPP accesses corresponding to the registered PLMNs associated with different USIMs. Thus, MA PDU sessions associated with MUSIM devices may be established, and the MUSIM device and anchor PLMN may perform ATSSS during the MA PDU session.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a MUSIM MA PDU session component 198 that is configured to transmit a registration request to a base station of a first PLMN, where the registration request indicates a UE capability for a MA PDU session associated with a MUSIM device, the MA PDU session including a plurality of PDU sessions associated with a single access type. The MUSIM MA PDU session component 198 is also configured to transmit a PDU session establishment request for a first PDU session of the PDU sessions in the first PLMN and for a second PDU session of the PDU sessions in a second PLMN, where the first PLMN is associated with a first USIM of the UE, and the second PLMN is associated with a second USIM of the UE.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
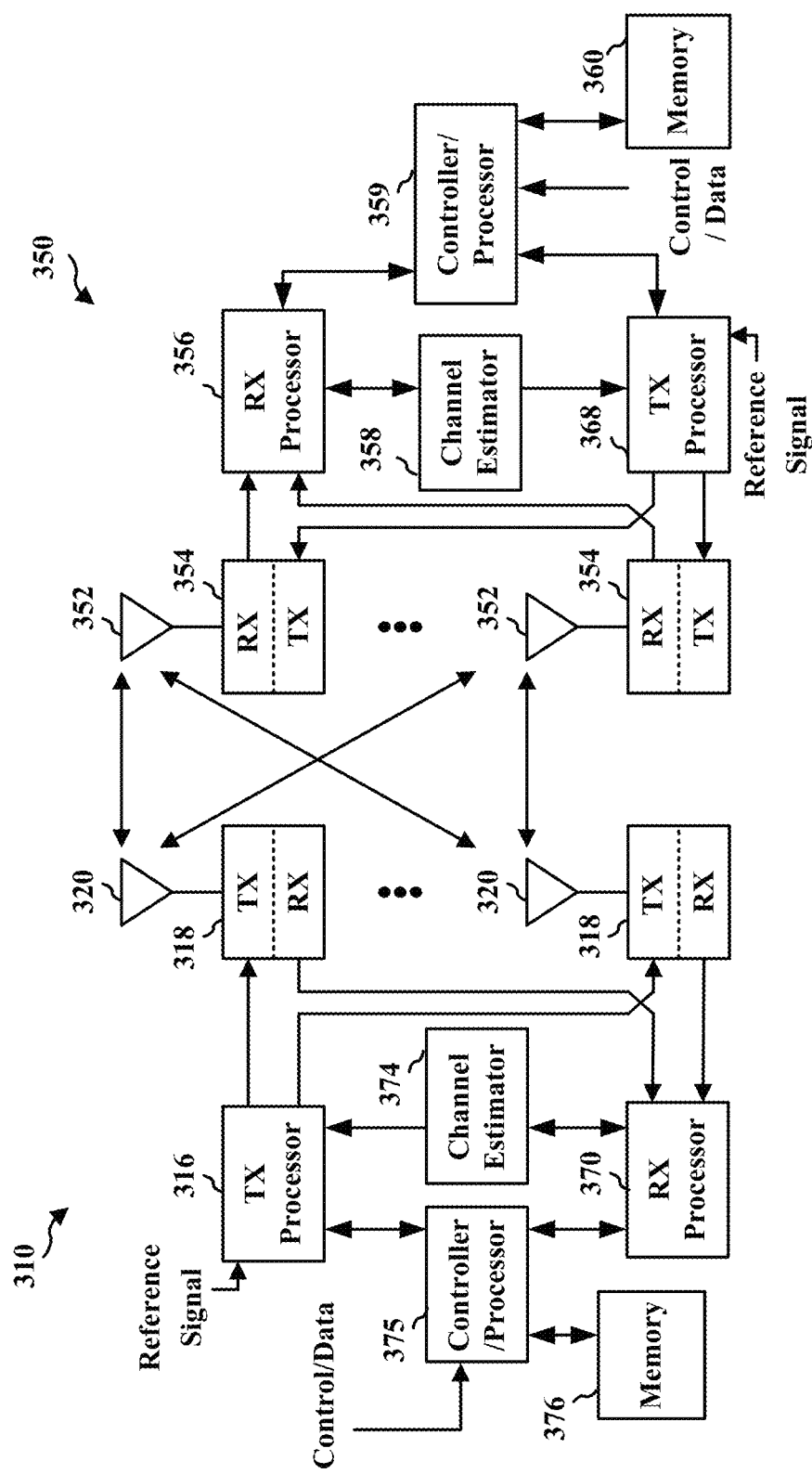
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with MUSIM MA PDU session component 198 of FIG. 1.

A mobile device (e.g., a UE) may include multiple USIMs. Such devices, also known as multi-USIM or MUSIM devices, are capable of maintaining a separate registration state with a PLMN for each USIM at least over 3GPP Access (e.g., cellular access [NR access or E-UTRA] or satellite access). For example, a MUSIM UE including two USIMs may initiate and maintain a separate registration state with a PLMN for each USIM, over 3GPP access, using separate identities (e.g., a mobile subscriber identity) and separate credentials (e.g., a set of encryption keys) associated with those USIMs. Each USIM may be associated with a same PLMN (e.g., a same home PLMN), or with different PLMNs (e.g., different home PLMNs).

For instance, each USIM may store a unique mobile subscriber identity including or derived from the same PLMN identity or a different PLMN identity. In some cases (for different PLMNs), one of the PLMNs may be a home PLMN, and the other PLMN may be a visiting PLMN. Moreover, the USIMs of a MUSIM device may not necessarily be physical USIMs (e.g., physical chips), but may be logical USIMs, or a combination of physical and logical USIMs.

A UE may also support ATSSS. ATSSS allows the UE to establish a MA PDU session with one or more base stations (e.g., in a same PLMN or in different PLMNs), within which PDU session the UE may communicate with the base station(s) simultaneously over a 3GPP access network and over a non-3GPP access network (e.g., a WLAN incorporating Wi-Fi), or alternatively over one of these access networks at a time. For instance, the UE may establish a PDU session providing a PDU connectivity service concurrently over 3GPP and non-3GPP access, which allows the UE to steer traffic of a data flow between the 3GPP and non-3GPP accesses, to switch traffic of an ongoing data flow from 3GPP to non-3GPP access or vice-versa while maintaining the continuity of the data flow, or to split the traffic of a data flow across the 3GPP and non-3GPP accesses. The UE may determine how to steer, switch, or split uplink traffic over the 3GPP access or the non-3GPP access instantaneously on a per-packet basis, based on delay, throughput, other criteria such as data rate and volume thresholds, or other access network performance measurements. The network (e.g., the UPF acting as PSA) may make a similar determination for downlink traffic to the UE. The UE may also determine how to steer, switch, or split uplink traffic based on policy (e.g., ATSSS rules) provided by the policy control function (PCF) of the network. In some cases, the UE may establish a MA PDU session with 3GPP access connected to an EPC (e.g., LTE/4G) and with non-3GPP access connected to a 5GC (e.g., NR/5G).

Figure 4:
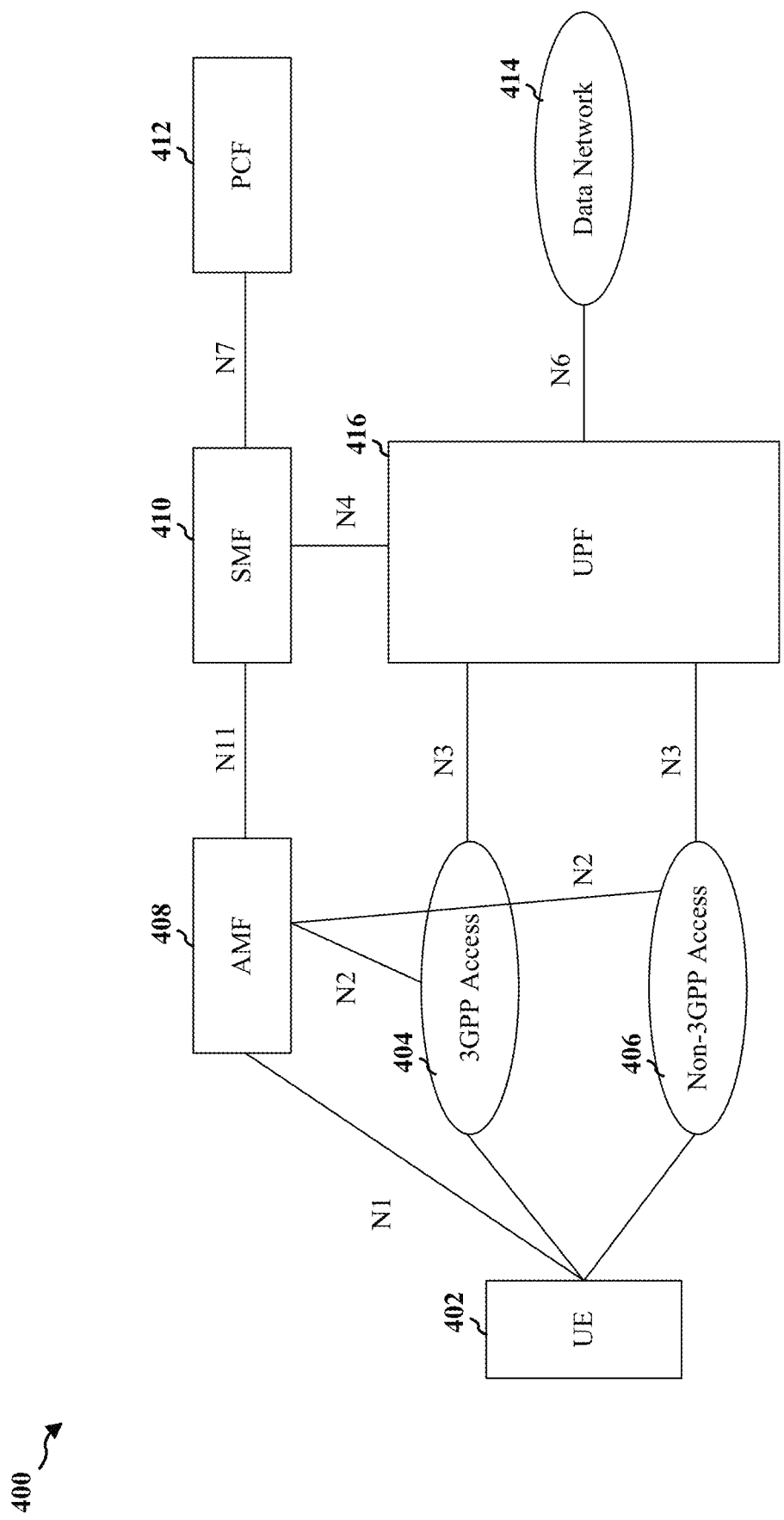
FIG. 4 is a diagram illustrating an example of a network architecture for Access Traffic Steering, Switching, and Splitting (ATSSS) support.

FIG. 4 illustrates an example 400 of a network architecture for ATSSS support. When a UE 402 supports ATSSS, the UE may request to establish a MA PDU session including user-plane resources on two access networks, including a 3GPP access network 404 and a non-3GPP access network 406. At the time the UE requests the MA PDU session, the UE may be registered via both access networks to a same PLMN or to different PLMNs, or the UE may be currently registered via one access only (and thus the UE may register and establish user-plane resources on the other access after the earlier access is established). The UE may send to AMF 408 the MA PDU session establishment request including the UE's ATSSS capabilities (e.g., its steering functionalities and supported steering modes), and the AMF in turn may inform SMF 410 that the UE is registered over both (or one) of the access networks 404, 406. During PDU session establishment, the SMF 410 may determine the ATSSS capabilities supported for the MA PDU session based on the UE's ATSSS capabilities and the data network name (DNN) configuration on the SMF, and the SMF may provide the ATSSS capabilities of the MA PDU session to PCF 412. The PCF may provide rules including MA PDU session control information to the SMF, which may then derive the ATSSS rules for the UE indicating how uplink traffic should be routed across 3GPP and non-3GPP accesses to data network 414, as well as other rules for UPF 416 indicating how downlink traffic should be routed across 3GPP and non-3GPP access from data network 414. In addition to routing downlink traffic to the UE over the different accesses based on the rules, the UPF 416 interfacing with data network 414 may also aggregate uplink traffic received over both accesses from the UE, as well as perform other PDU session-related services in its capacity as PSA. After the SMF derives the aforementioned rules, the SMF may confirm establishment of the MA PDU session, and the UE and network (e.g., PSA) may subsequently steer, switch, and split uplink and downlink traffic over the different access networks accordingly.

Thus, ATSSS currently applies to MA PDU Sessions involving 3GPP and non-3GPP accesses, including MA PDU sessions where the 3GPP access connects to an EPC (e.g., LTE/4G) and the non-3GPP access connects to a 5GC (e.g., NR/5G). The UE may be registered to the same PLMN or to a different PLMN over each access, or in cases where the 3GPP access connects to an EPC (e.g., LTE/4G) and the non-3GPP access connects to a 5GC (e.g., NR/5G), the UE registers to the same PLMN over each access. In the case of a same PLMN, the PLMN may be a home PLMN, and in the case of different PLMNs, one PLMN may be a home PLMN and the other PLMN may be a visiting PLMN. The UE may also apply the same identity and credentials stored in a USIM for each registration. For instance, the UE may apply the same mobile subscriber identity and the same encryption key stored in a single USIM when registering with a same PLMN or with different PLMNs over 3GPP and non-3GPP accesses, respectively. However, the UE may not currently establish MA PDU sessions involving two 3GPP accesses with the same PLMN or with different PLMNs.

Although these current limitations of ATSSS do not significantly impact UEs with a single USIM (e.g., for 3GPP access) and radio capability (e.g., for non-3GPP access), MUSIM devices on the other hand typically have dual USIMs and dual radio capability. Moreover, unlike single USIM devices, MUSIM devices may maintain separate registration states over 3GPP access with a same or different PLMNs using different identities and credentials. Currently while operating in these registration states, a MUSIM device may establish parallel, separate, single access PDU sessions over two 3GPP accesses with different PLMNs (e.g., with different base stations of different networks) in order to receive and transmit data individually in each network. However, the MUSIM device may not perform ATSSS or otherwise concurrently access the PLMNs over these cellular networks, since there is currently no support for MA PDU sessions over two 3GPP accesses with different PLMNs. For example, a MUSIM UE may be registered with different home PLMNs including respective UPFs, but the UPF serving as the PSA for a MA PDU session is currently unclear. Without the aforementioned support, MUSIM devices may not presently benefit from the robust connection and diversity provided by MA PDU sessions with different PLMNs, which sessions allow for concurrent (and individual) network access, improved adaptability to varying Quality of Service (QoS) constraints, and ATSSS capability, in comparison to single access PDU sessions. Although networks similarly do not currently support MA PDU sessions over two 3GPP access with a same PLMN, this lack of support is not as significant for MUSIM devices as in the different PLMN case. For example, a MUSIM device may simply establish a higher throughput, single access PDU session to achieve a more robust connection in the single PLMN case. Therefore, it would be helpful for networks to provide support for MA PDU sessions over two 3GPP accesses respectively with different PLMNs associated with different USIMs of a MUSIM device, in order to allow such devices to benefit from the concurrent network access, adaptability to QoS constraints, ATSSS capability, and other features currently available in MA PDU sessions for single USIM devices.

In order to support these MA PDU sessions over 3GPP access for MUSIM devices, various factors should be considered. In one example, the PLMNs involved in the MA PDU session should cooperate with each other in establishing and maintaining the MA PDU session. For example, a home PLMN may include a UPF which serves as the PSA for a MA PDU session. The PSA may route data between the UE and the data network, performs delay or throughput measurements for ATSSS, and provide ATSSS rules to the UE from the PCF for MA PDU sessions. In single USIM scenarios with MA PDU sessions over 3GPP and non-3GPP access with different PLMNs, data traffic may still end up routed through the same UPF/PSA. However, since MUSIM devices may be registered with two different home PLMNs respectively associated with a different USIM, each home PLMN's UPF should communicate with each other to determine which home PLMN will serve as the PSA for a MA PDU session. If two PLMNs collaborate with each other in this manner, then these PLMNs may support MA PDU sessions. But if two PLMNs do not collaborate with each other in this manner, then these PLMNs may not support MA PDU sessions. Therefore, when a UE is registering or registered with different PLMNs, those PLMNs should inform the MUSIM UE whether the network supports an MA PDU session, so that the MUSIM UE may determine whether it may establish a MA PDU session over 3GPP access with two PLMNs to which the UE is connected. Moreover, even if the support is present for two PLMNs, a clear agreement should be made between the MUSIM UE and the PLMNs as to which of the PLMNs will provide PSA support for the MA PDU session (e.g., which PLMN's UPF will route the data to the data network and provide the ATSSS rules). Additionally, in some cases, MUSIM UEs may themselves not support MA PDU sessions over 3GPP access via different PLMNs associated with respective USIMs (e.g., the UEs may not include the programmed logic to handle these sessions), and so the MUSIM UE should also inform the PLMNs whether the UE supports such MA PDU sessions.

Accordingly, aspects of the present disclosure provide for MA PDU sessions over two 3GPP accesses respectively via different PLMNs associated with respective USIMs of a MUSIM device, while addressing the various considerations noted above. In one aspect, during a registration procedure with a PLMN (e.g., PLMN A) at a NAS protocol layer, the MUSIM UE may provide a capability indication to the network indicating device support for these MA PDU sessions over 3GPP access with different PLMNs. For instance, when registering with a base station in PLMN A, the MUSIM UE may provide a registration request message to the base station indicating a capability for a MA PDU session associated with a MUSIM device (e.g., a MA PDU session over two 3GPP accesses with different PLMNs associated with respective USIMs of the device). This capability may be, for example, a flag (e.g., a '0' bit for lack of support and a '1' bit for support, or vice-versa). The UE may provide a registration request message including this capability to any PLMN with which the UE registers, whether home PLMNs or visiting PLMNs, and regardless of whether the UE is already registered from one of its USIMs with another PLMN at that time.

In another aspect, after the MUSIM UE provides a registration request message to a PLMN (e.g., PLMN A), the base station in the PLMN may similarly respond with a capability indication to the UE indicating network support for these MA PDU sessions over 3GPP access with different PLMNs. For instance, if the base station in the PLMN accepts the registration, the base station may provide a registration accept message to the UE indicating a capability for a MA PDU session associated with a MUSIM device (e.g., a MA PDU session over two 3GPP accesses with different PLMNs associated with respective USIMs of the device). The capability may be, for example, a flag, similar to the capability indication in the registration request message. Based on the exchange of these capability indications between the MUSIM UE and the base station in the PLMN, the MUSIM UE and base station may both determine that the other entity supports these MA PDU sessions.

In a further aspect, after the base station in the registered PLMN (e.g., PLMN A) accepts registration with the MUSIM UE and determines the UE supports MA PDU sessions over 3GPP access with different PLMNs, the base station may provision the UE with a list of other PLMNs which similarly support these MA PDU sessions. The list of PLMNs may include PLMN identities of different PLMNs (to which the UE may also register or has already registered) which may be associated with the MA PDU session. For example, if the base station in PLMN A indicates in the list the following PLMNs: PLMN B and PLMN C, then the UE may determine from the list that a MA PDU session associated with a MUSIM device may be established with PLMN A and PLMN B, or with PLMN A and PLMN C. Thus, if the UE is currently registered or eventually registers its different USIMs respectively with PLMN A and PLMN B in one example (or PLMN A and PLMN C in the other example), then the UE may initiate or establish a MA PDU session over 3GPP access respectively over each of these PLMNs. In contrast, if the UE is registered with, or intends to register with, a PLMN that is not on the list (e.g., PLMN D), the UE may not establish a MA PDU session associated with a MUSIM device with those PLMNs (e.g., PLMN A and PLMN D).

In one example, if the PLMN providing the list (e.g., PLMN A) is a home PLMN, and thus may access a respective USIM of the UE, the base station in the home PLMN may configure the list of PLMNs as a file in the USIM. For example, during initialization of the MUSIM device or during a configuration update, the base station in the home PLMN may configure in the respective USIM a list of PLMN identities supporting MA PDU sessions associated with a MUSIM device. The list of PLMN identities may initially include, for example, a configured number of PLMNs with which the base station may determine the UE to most likely register, and the list may update over time with PLMN identities associated with PLMNs with which the UE later registers. In another example, during the registration procedure, and in response to a registration request message from the UE indicating the MA PDU session capability indication for MUSIM devices, the base station in the PLMN accepting registration may include the list in the registration accept message. For example, the registration accept message may include an information element indicating a list of PLMN identities supporting MA PDU sessions associated with a MUSIM device. In a further example, as an alternative to (or in addition to) the registration accept message, the base station may provide a different NAS layer message indicating the list of supporting PLMN identities. For example, when the base station of a PLMN provides the UE a configuration update command to change an aspect of the UE configuration (e.g., to update a mobile subscriber identity in a respective USIM), the configuration update command may include an information element indicating a list of PLMN identities supporting MA PDU sessions associated with a MUSIM device. In any of these examples, if the UE determines that it is registered with the PLMN providing the list for one USIM and with a different PLMN on the list for another USIM, the UE may establish the MA PDU session with both PLMNs.

Similarly, for each PLMN with which the UE registers, the base station of that PLMN may provide a similar list. For example, if the UE registers with PLMN A and PLMN B, both base stations in their respective PLMNs may provide their own list of other PLMNs supporting MA PDU sessions associated with MUSIM devices. For example, the base station in PLMN B may indicate PLMN A in its list, just as the base station in PLMN A may indicate PLMN B in its list. The list may similarly be provided in accordance with any of the aforementioned examples (e.g., configured in a respective USIM by a home PLMN, provided in a registration accept message, or provided in a different NAS layer message). Moreover, when base stations in supporting PLMNs collaborate with each other to coordinate which UPF serves as the PSA for a MA PDU session, the base stations may update their respective lists to indicate the other PLMN's support accordingly.

After the MUSIM UE registers with the PLMNs supporting MA PDU sessions associated with MUSIM devices, the UE may select one of these PLMNs to be an anchor PLMN for the MA PDU session. Here, an anchor PLMN refers to a PLMN whose UPF will serve as PSA for the MA PDU session (and thus will provide the interface and data routing between the UE and the data network). In one example, if one of the two PLMNs with which the UE is registered is a home PLMN, the UE may select that home PLMN to be the anchor PLMN. For instance, if the MUSIM UE is registered with PLMN A for one USIM and PLMN B for another USIM, and the UE determines that PLMN A is the only registered home PLMN (e.g., PLMN B is a visiting PLMN), the UE may select PLMN A as the anchor PLMN. If, on the other hand, both PLMNs with which the UE is registered are home PLMNs, then the UE may select either one of these PLMNs as the anchor PLMN. For example, the MUSIM UE may select either PLMN A or PLMN B as the anchor PLMN for the MA PDU session in response to user input.

In another example, one of the registered PLMNs (e.g., a home or a visiting PLMN) may provide a list (or other indication) of other PLMNs including an anchor priority, flag, or other indication based on which the UE may select an anchor PLMN. For instance, if the MUSIM UE is registered with PLMN A for one USIM and PLMN B for another USIM (or later registers with PLMN B for the other USIM), PLMN A may provide a list to the UE including PLMN B which indicates whether PLMN A or PLMN B is to be the anchor. The list may be the same list as the list of supporting PLMNs for MA PDU sessions which is configured as a file in a USIM or indicated in a registration accept message or other NAS layer message as previously described. For instance, if PLMN A provides a registration accept message or other NAS layer message to the UE indicating that PLMN B and PLMN C support MA PDU sessions associated with MUSIM devices (or configures such indication in an associated USIM when PLMN A is a home PLMN), the message or configuration may also include an anchor priority (e.g., a flag) associated with PLMN B and PLMN C indicating whether the UE is to select one of those PLMNs as an anchor for an MA PDU session in the event the UE is registered with that PLMN. As an example, if the UE receives a list from PLMN A indicating that the anchor priority associated with PLMN B is a '1', and if the UE is registered with PLMN A from one USIM and PLMN B from another USIM, the UE may select PLMN B as the anchor; on the other hand, if the list indicates that the anchor priority associated with PLMN B is a '0', then the UE may select PLMN A as the anchor. If the UE registers with PLMN C from the other USIM instead of PLMN B (or after PLMN B), the UE may similarly make the anchor selection based on the anchor priority associated with PLMN C. Each PLMN to which the UE is registered may provide a similar list indicating anchor priorities of other PLMNs (as well as other supporting PLMNs for MA PDU sessions associated with MUSIM devices).

After the MUSIM UE has indicated its device capability (e.g., in a registration request message) to a PLMN for MA PDU sessions associated with MUSIM devices, determines a network capability (e.g., in a registration accept message) from the PLMN for MA PDU sessions associated with MUSIM devices, identifies other supporting PLMNs (e.g., in a USIM file configuration, the registration accept message, or other NAS layer message) which are capable of such MA PDU sessions, determines that the UE has registered with two PLMNs supporting such MA PDU sessions respectively from each USIM (with each registration over 3GPP access), and selects one of these two PLMNs as the anchor PLMN based on any the various examples previously described, the UE may establish a MA PDU session over the PLMN which the UE selected as the anchor PLMN. For example, the UE may provide a PDU session establishment request, which indicates a request type as a MA PDU request and its ATSSS capabilities, over one of the 3GPP accesses to the AMF in the anchor PLMN. The AMF may then select an SMF in the anchor PLMN supporting the MA PDU session and inform the SMF of the request for a MA PDU session. The SMF may afterwards establish the user-plane resources over the 3GPP access on which the PDU session establishment request was sent. For example, the SMF may send a MA PDU request indication to the PCF as well as the ATSSS capabilities, the PCF may provide rules from which the SMF may derive the ATSSS rules, the SMF may provide rules to the UPF, and the SMF may indicate to the AMF that the MA PDU session was accepted. The base station connected to the AMF may then provide a PDU session establishment accept to the UE over the established 3GPP access, indicating the UE that the requested MA PDU session was successfully established and including the ATSSS rules. Afterwards, the AMF (or some other network entity in either the anchor PLMN or the other PLMN) may select an SMF in the other PLMN supporting the MA PDU session to similarly initiate establishment of user-plane resources over the other one of the 3GPP accesses such as previously described. Subsequently, the UE and base station may communicate uplink and downlink data within the MA PDU session over the two 3GPP accesses corresponding to the registered PLMNs associated with different USIMs. Thus, MA PDU sessions associated with MUSIM devices may be established, and the MUSIM device and anchor PLMN may perform ATSSS during the MA PDU session.

Figure 5:
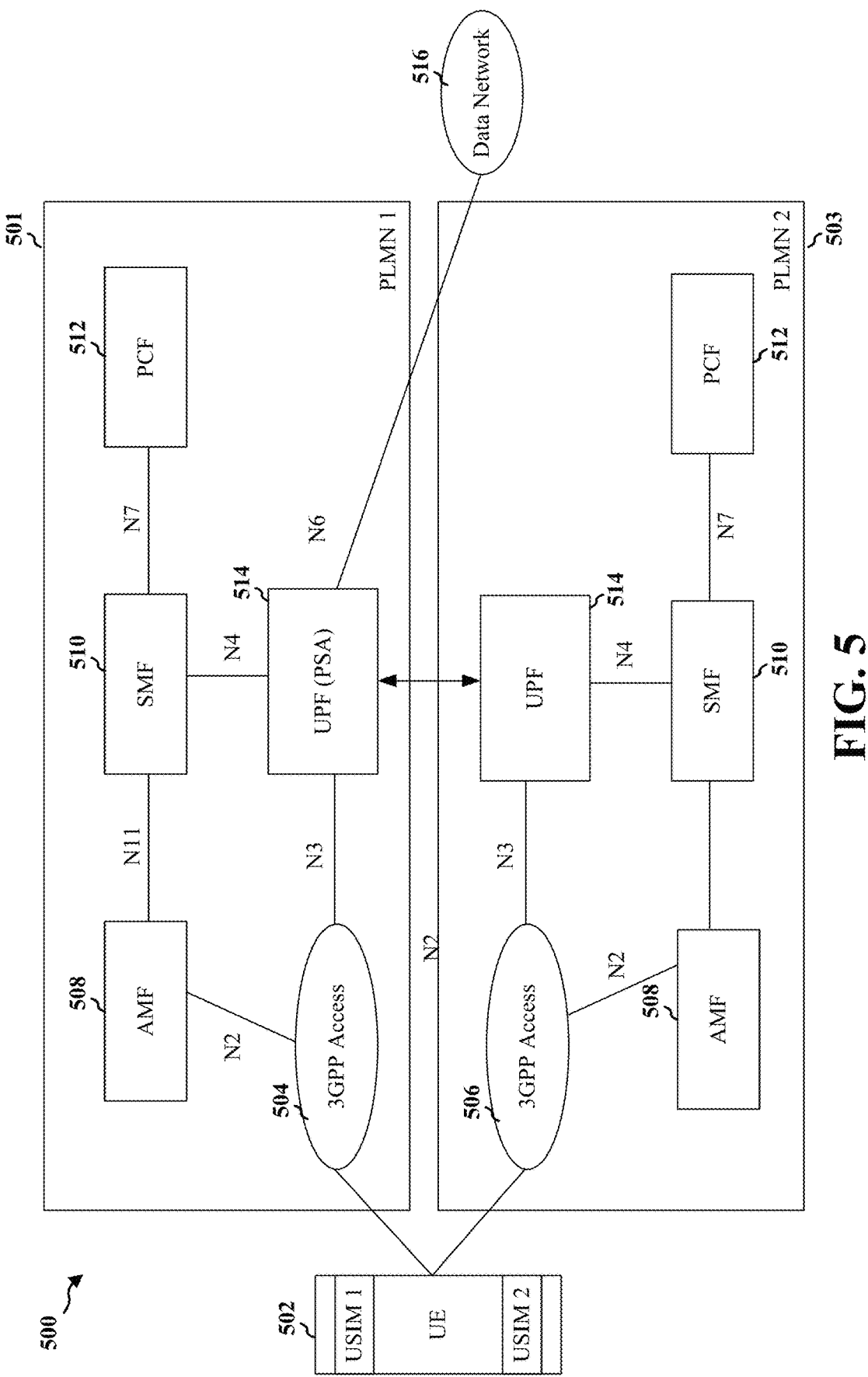
FIG. 5 is a diagram illustrating an example of a network architecture for an MA PDU session associated with a MUSIM device.

FIG. 5 illustrates an example 500 of a network architecture for an MA PDU session associated with a UE 502 including multiple USIMs. For example, UE 502 may be registered with two PLMNs 501, 503 over a first 3GPP access network 504 and a second 3GPP access network 506, respectively. Each PLMN may include an AMF 508, a SMF 510, a PCF 512, and a UPF 514. One of the UPFs 514 (e.g., in PLMN 501) may serve as a PSA that interfaces and routes data to and from a data network 516. Additionally, the UPFs 514 may be coupled together over a link 518, which link allows the UPFs to collaborate with each other and determine supporting PLMNs for MA PDU sessions.

Initially, according to one example, the UE 502 may provide a registration request message to PLMN 501 indicating the UE's capability for MA PDU sessions associated with MUSIM devices. Afterwards, the UE 502 may receive a registration accept message from the PLMN 501 indicating the PLMN's capability for MA PDU sessions associated with MUSIM devices. Next, the UE may identify from a USIM file configuration, the registration accept message, or other NAS layer message that PLMN 503 is another PLMN which is capable of such MA PDU sessions. After UE has registered with both PLMNs 501, 503 respectively from each USIM, the UE may select one of these PLMNs as the anchor PLMN (in this example, PLMN 501) for the MA PDU session. Finally, the UE may request the anchor PLMN (PLMN 501 in this example) to establish a MA PDU session including user-plane resources on the two 3GPP networks. At this point, the process of MA PDU session establishment may be similar to that described above with respect to FIG. 4.

Figure 6A:
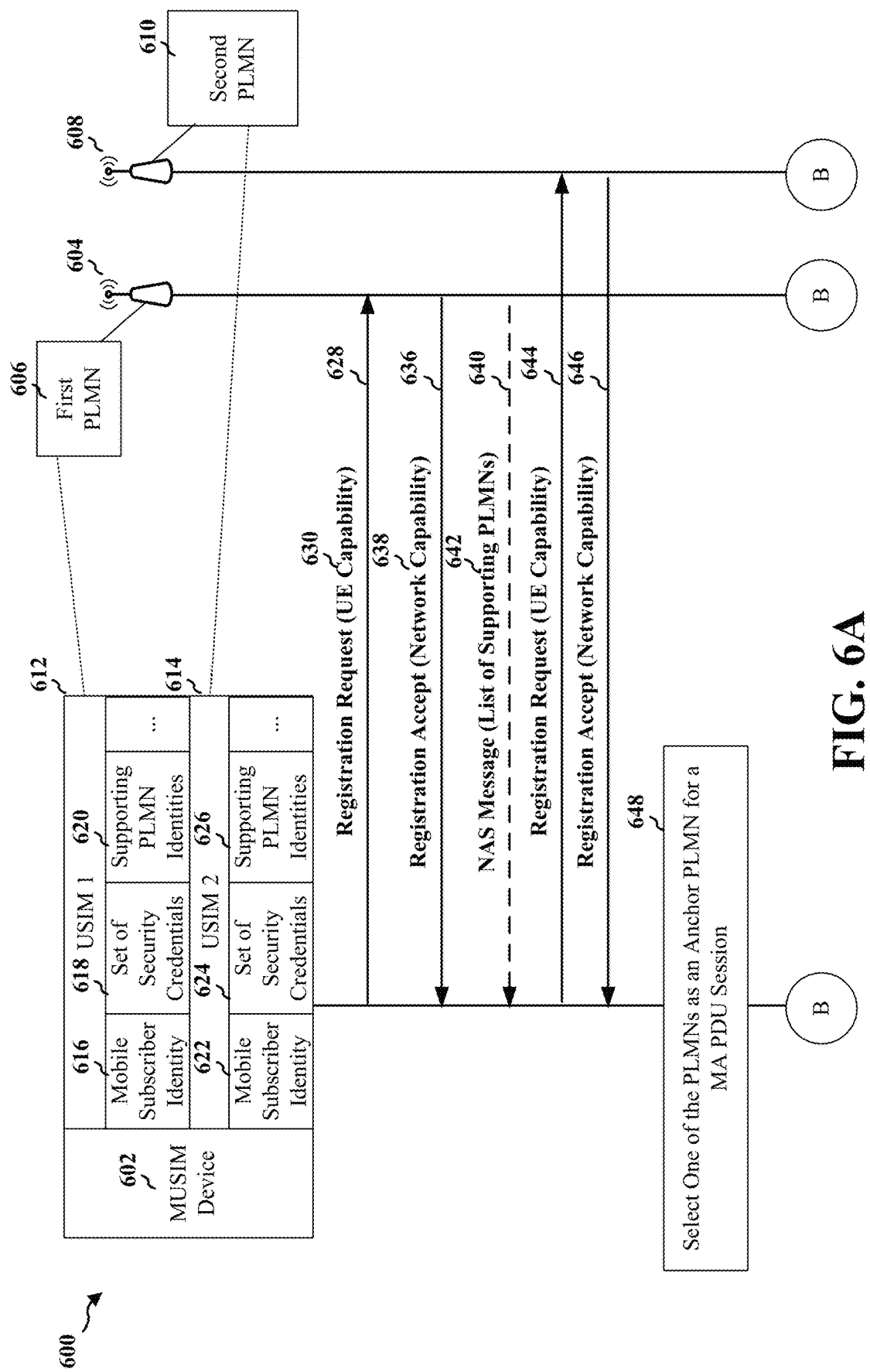
FIGS. 6A-6B are a diagram illustrating a call flow between a MUSIM device and base stations in different PLMNs.
Figure 6B:
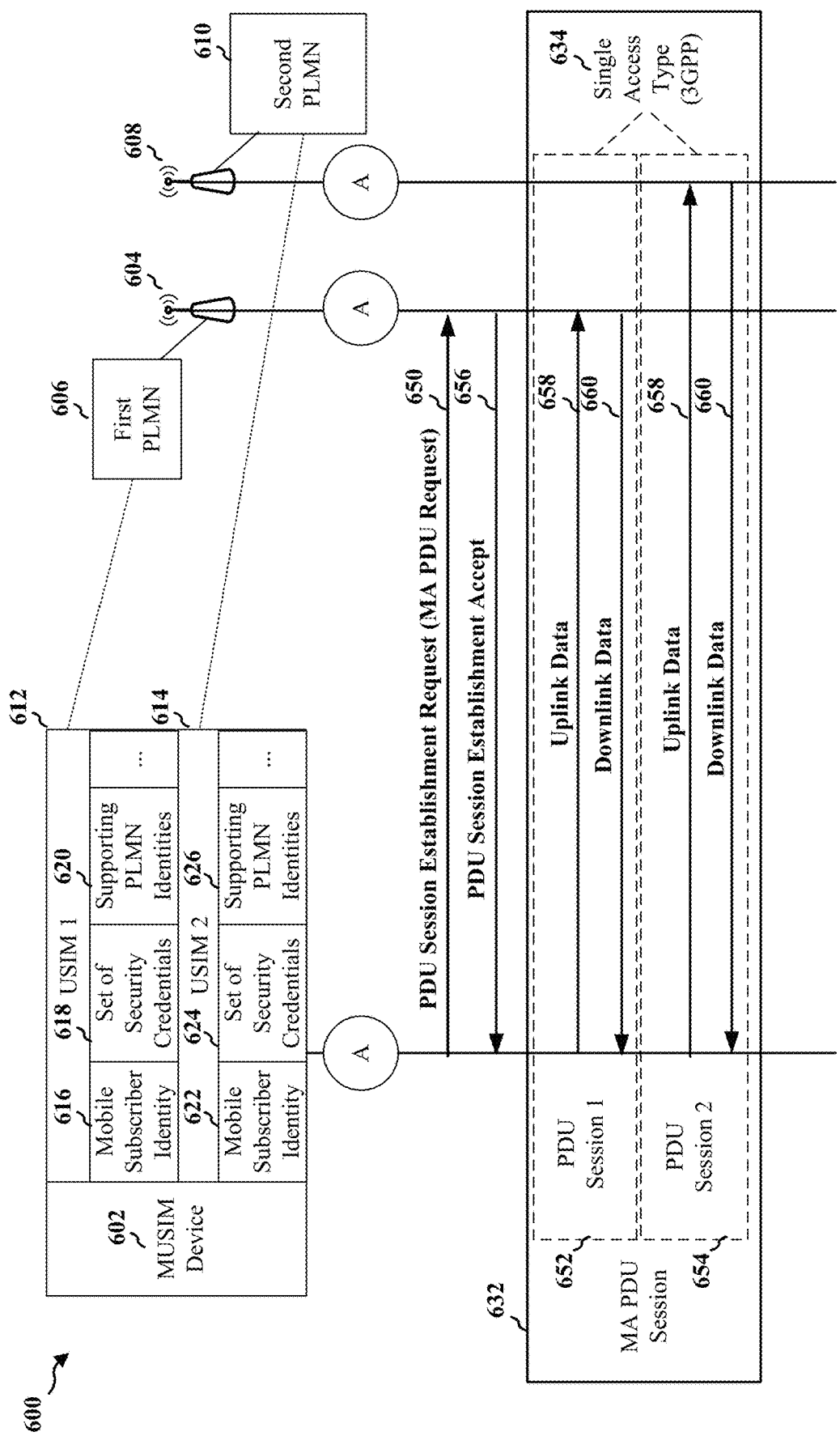

FIGS. 6A and 6B illustrate an example 600 of a call flow between a MUSIM device 602 (e.g., UE 104, 502), a base station 604 of a first PLMN 606 (e.g., base station 102/180 of PLMN 501), and a base station 608 of a second PLMN 610 (e.g., base station 102/180 of PLMN 503) different than the first PLMN. Referring to FIG. 6A, the MUSIM device 602 may include a first USIM 612 and a second USIM 614. The first USIM may include a first mobile subscriber identity 616, a first set of security credentials 618, and other USIM parameters. For instance, the first USIM may store a first list 620 of PLMN identities supporting MA PDU sessions associated with MUSIM devices (e.g., during initialization of the MUSIM device or during a UE configuration update). Similarly, the second USIM may include a second mobile subscriber identity 622, a second set of security credentials 624, and other USIM parameters. For instance, the second USIM may store a second list 626 of PLMN identities supporting MA PDU sessions associated with MUSIM devices (e.g., during initialization of the MUSIM device or during a configuration update).

The first USIM 612 may be associated with the first PLMN 606, and the second USIM 614 may be associated with the second PLMN 610. For instance, the first mobile subscriber identity 616 of the first USIM 612 may include or be derived from a mobile country code (MCC) and mobile network code (MNC) of the first PLMN 606 (e.g., a first PLMN identity), and the second mobile subscriber identity 622 of the second USIM 614 may include or be derived from a MCC and MNC of the second PLMN 610 (e.g., a second PLMN identity). Each mobile subscriber identity 616, 622 may be an identity stored in the respective USIM or derived from identity information stored in USIM, and may include, for example, a subscription concealed identifier (SUCI) containing an international mobile subscriber identity (IMSI), a 5G-Globally Unique Temporary Identifier (5G-GUTI), an international mobile station equipment identity (IMEI), a IMEI and software version number (IMSEISV), a 5G-S-Temporary Mobile Subscription Identifier (5G-S-TMSI), a MAC address, or an Extended Unique Identifier (EUI)-64 of the MUSIM device 602. Moreover, each set of security credentials 618, 624 may be, for example, a NAS key set (e.g., indicated by a NAS key set identifier (ngKSI)) applied to communication between the MUSIM device and base station 604, 608, respectively, or may be some other security parameter associated with an encryption key set specific to the MUSIM device, which may be derived from the keys stored in the respective USIM.

In one example, first PLMN 606 may be a home PLMN. For instance, first PLMN 606 may include an MCC and MNC that match an MCC and MNC of an IMSI stored in first USIM 612. Similarly, second PLMN 610 may be a different home PLMN than first PLMN 606. For instance, second PLMN 610 may include an MCC and MNC that match an MCC and MNC of an IMSI stored in second USIM 614. Alternatively, in another example, at least one of the first PLMN 606 or the second PLMN 610 may not be a home PLMN. For instance, either or both PLMNs may be visiting PLMNs (e.g., PLMNs including an MCC and MNC that do not match the MCC and MNC of an IMSI stored in a respective USIM).

Still referring to FIG. 6A, during registration with the first PLMN 606, the MUSIM device 602 may provide a registration request message 628 to base station 604 including a UE capability 630 for a MA PDU session (e.g., MA PDU session 632 in FIG. 6B) associated with a MUSIM device. For instance, the registration request message 628 may indicate a capability of the MUSIM device 602 for MA PDU session 632 over a single access type 634, namely two 3GPP accesses respectively, with the different PLMNs 606, 610 respectively associated with USIMs 612, 614. This capability may be, for example, a flag (e.g., a '0' bit for lack of support and a '1' bit for support, or vice-versa). After receiving the registration request message 628, the base station 604 may provide a registration accept message 636 accepting the registration with first PLMN 606 including a network capability 638 for a MA PDU session (e.g., MA PDU session 632 in FIG. 6B) associated with the MUSIM device. For instance, the registration accept message 636 may similarly indicate a capability of the first PLMN 606 for MA PDU session 632 over single access type 634, namely two 3GPP accesses respectively, with the different PLMNs 606, 610 respectively associated with USIMs 612, 614. The capability may be, for example, a flag, similar to the capability indication in the registration request message. The base station 604 or other network entities of first PLMN 606 may determine this network capability in response to coordination with base station 608 or other network entities of second PLMN 610.

During or after registering with the MUSIM device 602, the base station 604 may provide a NAS message 640 including a list of PLMN identities 642 that may each support a MA PDU session (e.g., MA PDU session 632 in FIG. 6B) with the MUSIM device (other than first PLMN 606). For instance, the base station 604 in the first PLMN 606 may indicate the identity of second PLMN 610 in the list (e.g., a MNC and MCC of second PLMN 610), so that the UE may determine that a MA PDU session associated with a MUSIM device may be established with the first PLMN 606 and the second PLMN 610. The base station 604 or other network entities of first PLMN 606 may determine the PLMN identities to include in this list in response to coordination with other base stations (e.g., base station 608) or other network entities of other PLMNs (e.g., second PLMN 610). In one example, the NAS message 640 including the list of PLMN identities 642 may be the registration accept message 636. For instance, the base station 604 may include in registration accept message 636 the list of PLMN identities (including second PLMN 610) with which the UE may establish MA PDU session 632 over single access type 634, namely two 3GPP accesses respectively, with different PLMNs 606, 610 respectively associated with USIMs 612, 614. In another example, the NAS message 640 including the list of PLMN identities 642 may be a configuration update command or other NAS layer message different than registration accept message 636. For instance, the base station 604 may include in the configuration update command or other NAS layer message the list of PLMN identities (including second PLMN 610) with which the UE may establish MA PDU session 632 over single access type 634, namely two 3GPP accesses respectively, with different PLMNs 606, 610 respectively associated with USIMs 612, 614. In a further example, as an alternative to or in addition to providing the list of PLMN identities 642 in a NAS layer message and if first PLMN 606 is a home PLMN for MUSIM device 602, the first PLMN 606 may configure these PLMN identities directly in the first USIM 612 associated with first PLMN (e.g., during initialization or a configuration update). This configuration may be stored or updated in the first USIM 612 as the first list 620 of PLMN identities supporting MA PDU sessions associated with MUSIM devices.

At the time MUSIM device 602 is configured with the list of PLMN identities 642 (e.g., in registration accept message 636, NAS layer message 640 or in the first list 620 of PLMN identities), the MUSIM device may already be registered with second PLMN 610. Alternatively, the MUSIM device 602 may not be registered yet with second PLMN 610, and may register with the second PLMN following the configuration. In such case, during registration with the second PLMN 610, the MUSIM device 602 may similarly provide a registration request message 644 to base station 608 including a UE capability for a MA PDU session (e.g., MA PDU session 632 in FIG. 6B) associated with a MUSIM device. After receiving the registration request message 644, the base station 608 may similarly provide a registration accept message 646 accepting the registration with second PLMN 610 including a network capability for a MA PDU session (e.g., MA PDU session 632 in FIG. 6B) associated with the MUSIM device. Moreover, during or after registration, the base station 608 or other network entity of second PLMN 610 may configure MUSIM device 602 with a similar list of PLMN identities supporting the MA PDU session (e.g., in registration accept message 646, a different NAS layer message, or in the second list 626 of PLMN identities).

After the MUSIM device 602 has registered with first PLMN 606 and second PLMN 610, at block 648, the MUSIM device may select one of these PLMNs to be an anchor PLMN for MA PDU session 632. For instance, the MUSIM device may determine whether any of these PLMNs are home PLMNs, and in response to this determination, the MUSIM device may identify that PLMN as the PLMN in which to send a PDU session establishment request for MA PDU session 632. In one example, if the MUSIM device determines that one of the two PLMNs 606, 610 with which the MUSIM device is registered is a home PLMN, the MUSIM device may select that home PLMN to be the anchor PLMN. If, on the other hand, the MUSIM device determines that both PLMNs with which the device is registered are home PLMNs, then the MUSIM device may select either one of these PLMNs as the anchor PLMN (e.g., in response to user input). In another example, the MUSIM device may determine whether the second PLMN 610 indicated in the list of PLMN identities 642 from registration accept message 636, NAS layer message 640, or the first list 620 of PLMN identities, includes an anchor priority indicating whether that PLMN is to be the anchor, and in response to this determination, the MUSIM device may determine one of the two PLMNs as the PLMN in which to send a PDU session establishment request for MA PDU session 632. As an example, if the MUSIM device receives the list from first PLMN 606 indicating that the anchor priority (e.g., a flag) associated with the second PLMN 610 is a '1', the MUSIM device may select the second PLMN 610 as the anchor, while if the list indicates that the anchor priority associated with the second PLMN 610 is a '0', then the MUSIM device may select the first PLMN 606 as the anchor.

Referring now to FIG. 6B, after the MUSIM device 602 selected at block 648 one of the PLMNs 606, 610 as the anchor PLMN (e.g., first PLMN 606), the MUSIM device 602 may request to establish MA PDU session 632 over the anchor PLMN. For instance, the MUSIM device 602 may provide to base station 604 in first PLMN 606, a PDU session establishment request message 660 including a request type of MA PDU request to establish a first PDU session 652 in first PLMN 606 (over 3GPP access) and a second PDU session 654 in second PLMN 610 (over another 3GPP access). After the first PDU session 652 and the second PDU session 654 are established (e.g., the SMF of first PLMN 606 establishes user-plane resources over one 3GPP access and the SMF of second PLMN 610 establishes user-plane resources over another 3GPP access), the base station 604 may provide to MUSIM device 602 a PDU session establishment accept message 656 indicating that the MA PDU session 632 was successfully established. Subsequently, the MUSIM device 602 and PLMNs 606, 610 may communicate uplink data 658 and downlink data 660 within their respective PDU sessions 652, 654 of the MA PDU session 632 over the two 3GPP accesses respectively, where each PLMN is respectively associated with a different USIM of MUSIM device 602.

Figure 7:
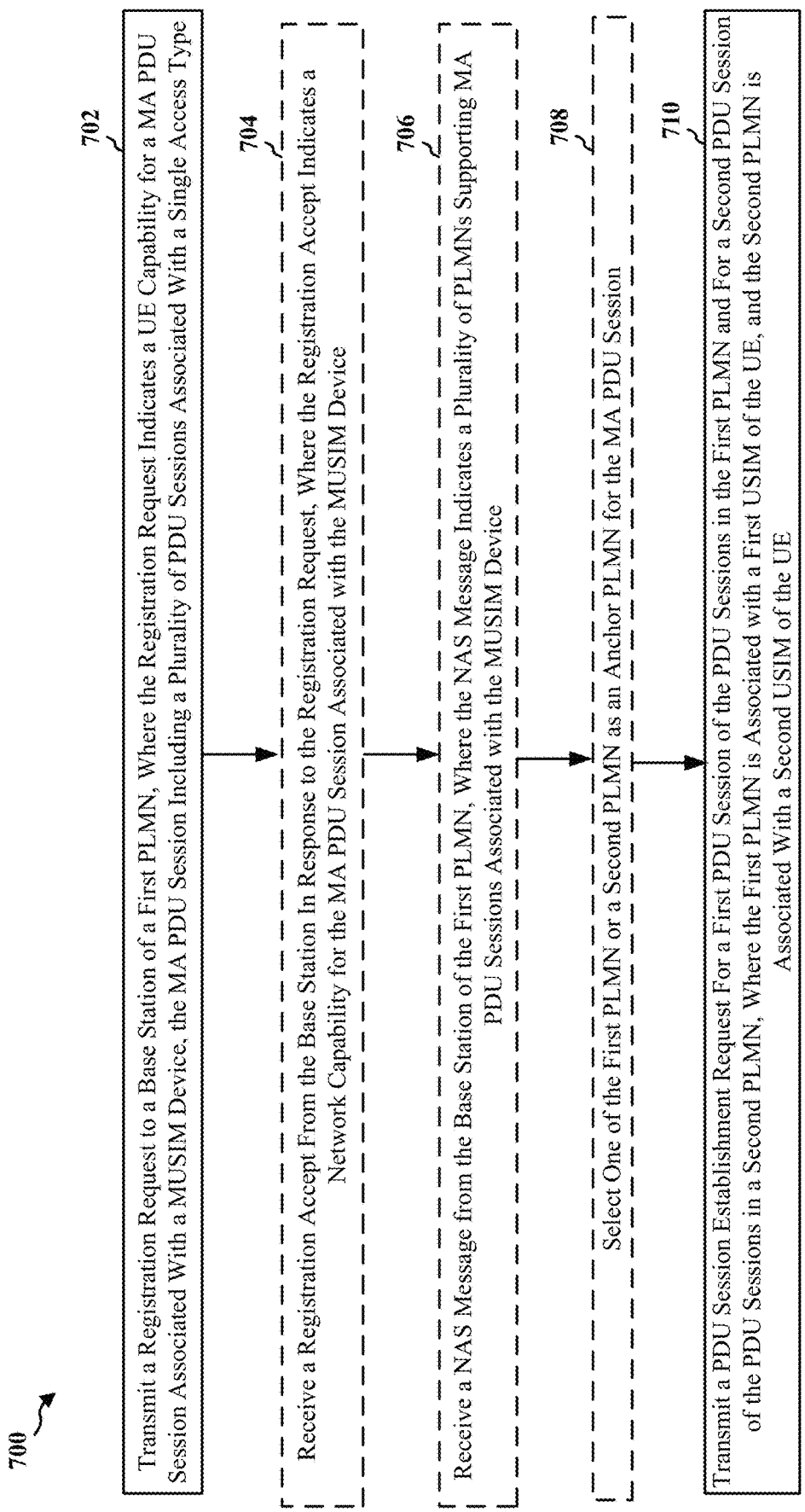
FIG. 7 is a flowchart of a method of wireless communication.

FIG. 7 is a flowchart 700 of a method of wireless communication. The method may be performed by a UE (e.g., the UE 104, 502; the MUSIM device 602; the apparatus 802). Optional aspects are illustrated in dashed lines. The method allows a UE (e.g., a MUSIM device) to establish a MA PDU session over two 3GPP accesses respectively with different PLMNs associated with different USIMs (e.g., a first USIM and a second USIM) of the MUSIM device.

At 702, the UE transmits a registration request to a base station of a first PLMN, where the registration request indicates a UE capability for a MA PDU session associated with a MUSIM device, and the MA PDU session includes a plurality of PDU sessions associated with a single access type. For example, 702 may be performed by registration request component 840. The single access type may be 3GPP access. The 3GPP access may comprise NR access, E-UTRA, or satellite access. For example, referring to FIGS. 6A-6B, the MUSIM device 602 may provide registration request message 628 to base station 604 of first PLMN 606 indicating UE capability 630 for MA PDU session 632 associated with MUSIM device 602, where MA PDU session 632 includes PDU sessions 652, 654 associated with single access type 634 (namely, 3GPP access). For instance, the registration request message 628 may indicate a capability of the MUSIM device 602 for MA PDU session 632 over the single access type 634, namely two 3GPP accesses respectively, with the different PLMNs 606, 610 respectively associated with USIMs 612, 614. This capability may be, for example, a flag (e.g., a '0' bit for lack of support and a '1' bit for support, or vice-versa). In one example, the MUSIM device 602 (e.g., UE 350) may transmit the registration request to base station 310, 604 according to the following example process: the UE may encode the registration request (e.g., in the controller/processor 359), the UE may modulate the encoded registration request (e.g., in the TX processor 368), and the UE may send the modulated and encoded registration request using one or more of the antennas 352.

At 704, the UE may receive a registration accept from the base station in response to the registration request, where the registration accept indicates a network capability for the MA PDU session associated with the MUSIM device. For example, 704 may be performed by registration accept component 842. For instance, referring to FIGS. 6A-6B, after receiving the registration request message 628, the base station 604 may provide registration accept message 636 accepting the registration with first PLMN 606 including network capability 638 for MA PDU session 632 associated with the MUSIM device 602. For instance, the registration accept message 636 may similarly indicate a capability of the first PLMN 606 for MA PDU session 632 over single access type 634, namely two 3GPP accesses respectively, with the different PLMNs 606, 610 respectively associated with USIMs 612, 614. The capability may be, for example, a flag, similar to the capability indication in the registration request message. The base station 604 or other network entities of first PLMN 606 may determine this network capability in response to coordination with base station 608 or other network entities of second PLMN 610. In one example, the MUSIM device 602 (e.g., UE 350) may receive the registration accept message 636 from base station 310, 604 according to the following example process: the UE may obtain the registration accept message using one or more of the antennas 352, the UE may demodulate the obtained registration accept message (e.g., in RX processor 356), and the UE may decode the demodulated registration accept message (e.g., in the controller/processor 359). The UE may also store the decoded registration accept message in memory 360.

At 706, the UE may receive a NAS message from the base station of the first PLMN, where the NAS message indicates a plurality of PLMNs supporting MA PDU sessions associated with the MUSIM device. For example, 706 may be performed by NAS message component 844. For instance, referring to FIGS. 6A-6B, during or after registering with the MUSIM device 602, the base station 604 may provide NAS message 640 including list of PLMN identities 642 that may each support MA PDU session 632 with the MUSIM device 602 (other than first PLMN 606). For instance, the base station 604 in the first PLMN 606 may indicate the identity of second PLMN 610 in the list (e.g., a MNC and MCC of second PLMN 610), so that the UE may determine that a MA PDU session associated with a MUSIM device may be established with the first PLMN 606 and the second PLMN 610. The base station 604 or other network entities of first PLMN 606 may determine the PLMN identities to include in this list in response to coordination with other base stations (e.g., base station 608) or other network entities of other PLMNs (e.g., second PLMN 610). In one example, the NAS message 640 including the list of PLMN identities 642 may be the registration accept message 636. For instance, the base station 604 may include in registration accept message 636 the list of PLMN identities (including second PLMN 610) with which the UE may establish MA PDU session 632 over single access type 634, namely two 3GPP accesses respectively, with different PLMNs 606, 610 respectively associated with USIMs 612, 614. In another example, the NAS message 640 including the list of PLMN identities 642 may be a configuration update command or other NAS layer message different than registration accept message 636. For instance, the base station 604 may include in the configuration update command or other NAS layer message the list of PLMN identities (including second PLMN 610) with which the UE may establish MA PDU session 632 over single access type 634, namely two 3GPP accesses respectively, with different PLMNs 606, 610 respectively associated with USIMs 612, 614. In one example, the MUSIM device 602 (e.g., UE 350) may receive the NAS message 640 from base station 310, 604 according to the following example process: the UE may obtain the NAS message using one or more of the antennas 352, the UE may demodulate the obtained NAS message (e.g., in RX processor 356), and the UE may decode the demodulated NAS message (e.g., in the controller/processor 359). The UE may also store the decoded NAS message in memory 360.

The first USIM may store a plurality of PLMN identities of PLMNs supporting MA PDU sessions associated with the MUSIM device. For instance, referring to FIGS. 6A-6B, as an alternative to or in addition to providing the list of PLMN identities 642 in a NAS layer message and if first PLMN 606 is a home PLMN for MUSIM device 602, the first PLMN 606 may configure these PLMN identities directly in the first USIM 612 associated with first PLMN (e.g., during initialization or a configuration update). This configuration may be stored or updated in the first USIM 612 as the first list 620 of PLMN identities supporting MA PDU sessions associated with MUSIM devices.

At 708, the UE may select one of the first PLMN or a second PLMN as an anchor PLMN for the MA PDU session. For example, 708 may be performed by anchor PLMN selection component 846. In one example, the anchor PLMN may be selected from a home PLMN for one of the first USIM or the second USIM. In one example, the anchor PLMN may be selected from an indicated PLMN in a NAS message from the base station. In one example, the anchor PLMN may be selected from a PLMN identity stored in the first USIM. For instance, referring to FIGS. 6A-6B, after the MUSIM device 602 has registered with first PLMN 606 and second PLMN 610, at block 648, the MUSIM device may select one of these PLMNs to be an anchor PLMN for MA PDU session 632. For instance, in one example selection process, the MUSIM device may determine whether any of these PLMNs are home PLMNs, and in response to this determination, the MUSIM device may identify that PLMN as the PLMN in which to send a PDU session establishment request for MA PDU session 632. In one example, if the MUSIM device determines that one of the two PLMNs 606, 610 with which the MUSIM device is registered is a home PLMN, the MUSIM device may select that home PLMN to be the anchor PLMN. If, on the other hand, the MUSIM device determines that both PLMNs with which the device is registered are home PLMNs, then the MUSIM device may select either one of these PLMNs as the anchor PLMN (e.g., in response to user input). In another example selection process, the MUSIM device may determine whether the second PLMN 610 indicated in the list of PLMN identities 642 from registration accept message 636, NAS layer message 640, or the first list 620 of PLMN identities, includes an anchor priority indicating whether that PLMN is to be the anchor, and in response to this determination, the MUSIM device may determine one of the two PLMNs as the PLMN in which to send a PDU session establishment request for MA PDU session 632. As an example, if the MUSIM device receives the list from first PLMN 606 indicating that the anchor priority (e.g., a flag) associated with the second PLMN 610 is a '1', the MUSIM device may select the second PLMN 610 as the anchor, while if the list indicates that the anchor priority associated with the second PLMN 610 is a '0', then the MUSIM device may select the first PLMN 606 as the anchor.

Finally, at 710, the UE may transmit a PDU session establishment request for a first PDU session of the PDU sessions in the first PLMN and for a second PDU session of the PDU sessions in the second PLMN. For example, 710 may be performed by PDU session establishment component 848. The PDU session establishment request may be transmitted in the anchor PLMN selected at 708. For instance, referring to FIGS. 6A-6B, after the MUSIM device 602 selects at block 648 one of the PLMNs 606, 610 as the anchor PLMN (e.g., first PLMN 606), the MUSIM device 602 may request to establish MA PDU session 632 over the anchor PLMN. For instance, the MUSIM device 602 may provide to base station 604 in first PLMN 606, a PDU session establishment request message 650 including a request type of MA PDU request to establish first PDU session 652 in first PLMN 606 (over 3GPP access) and second PDU session 654 in second PLMN 610 (over another 3GPP access). After the first PDU session 652 and the second PDU session 654 are established (e.g., the SMF of first PLMN 606 establishes user-plane resources over one 3GPP access and the SMF of second PLMN 610 establishes user-plane resources over another 3GPP access), the base station 604 may provide to MUSIM device 602 a PDU session establishment accept message 656 indicating that the MA PDU session 632 was successfully established. Subsequently, the MUSIM device 602 and PLMNs 606, 610 may communicate uplink data 658 and downlink data 660 within their respective PDU sessions 652, 654 of the MA PDU session 632 over the two 3GPP accesses respectively, where each PLMN is respectively associated with a different USIM of MUSIM device 602. In one example, the MUSIM device 602 (e.g., UE 350) may transmit the PDU session establishment request to base station 310, 604 according to the following example process: the UE may encode the PDU session establishment request (e.g., in the controller/processor 359), the UE may modulate the encoded PDU session establishment request (e.g., in the TX processor 368), and the UE may send the modulated and encoded PDU session establishment request using one or more of the antennas 352.

The first PLMN may be associated with the first USIM of the UE, and the second PLMN is associated with the second USIM of the UE. For example, the first PLMN may be associated with the first USIM in the registration request, and the second PLMN may be associated with the second USIM in a second registration request. The registration request may include first information from the first USIM, and the second registration request may include second information from the second USIM. The first information may comprise a first mobile subscriber identity and a first set of security credentials, and the second information may comprise a second mobile subscriber identity and a second set of security credentials. For instance, referring to FIGS. 6A-6B, the first USIM 612 may be associated with the first PLMN 606, and the second USIM 614 may be associated with the second PLMN 610. For instance, the first mobile subscriber identity 616 of the first USIM 612, which may be included in registration request 628, may include or be derived from a MCC and MNC of the first PLMN 606 (e.g., a first PLMN identity), and the second mobile subscriber identity 622 of the second USIM 614, which may be included in registration request 644, may include or be derived from a MCC and MNC of the second PLMN 610 (e.g., a second PLMN identity). Each mobile subscriber identity 616, 622 may be an identity stored in the respective USIM or derived from identity information stored in USIM, and may include, for example, a SUCI containing an IMSI, a 5G-GUTI, an IMEI, an IMSEISV, a 5G-S-TMSI, a MAC address, or an EUI-64 of the MUSIM device 602. Moreover, each set of security credentials 618, 624 may be, for example, a NAS key set (e.g., indicated by a NAS key set identifier (ngKSI)) applied to communication between the MUSIM device and base station 604, 608, respectively, or may be some other security parameter associated with an encryption key set specific to the MUSIM device, which may be derived from the keys stored in the respective USIM.

In one example, the first PLMN may be a first home PLMN for the first USIM and the second PLMN may be a second home PLMN for the second USIM. In another example, one of the first PLMN for the first USIM or the second PLMN for the second USIM may be a home PLMN. For instance, referring to FIGS. 6A-6B, in one example, first PLMN 606 may be a home PLMN. For instance, first PLMN 606 may include an MCC and MNC that match an MCC and MNC of an IMSI stored in first USIM 612. Similarly, second PLMN 610 may be a different home PLMN than first PLMN 606. For instance, second PLMN 610 may include an MCC and MNC that match an MCC and MNC of an IMSI stored in second USIM 614. Alternatively, in another example, at least one of the first PLMN 606 or the second PLMN 610 may not be a home PLMN. For instance, either or both PLMNs may be visiting PLMNs (e.g., PLMNs including an MCC and MNC that do not match the MCC and MNC of an IMSI stored in a respective USIM).

Figure 8:
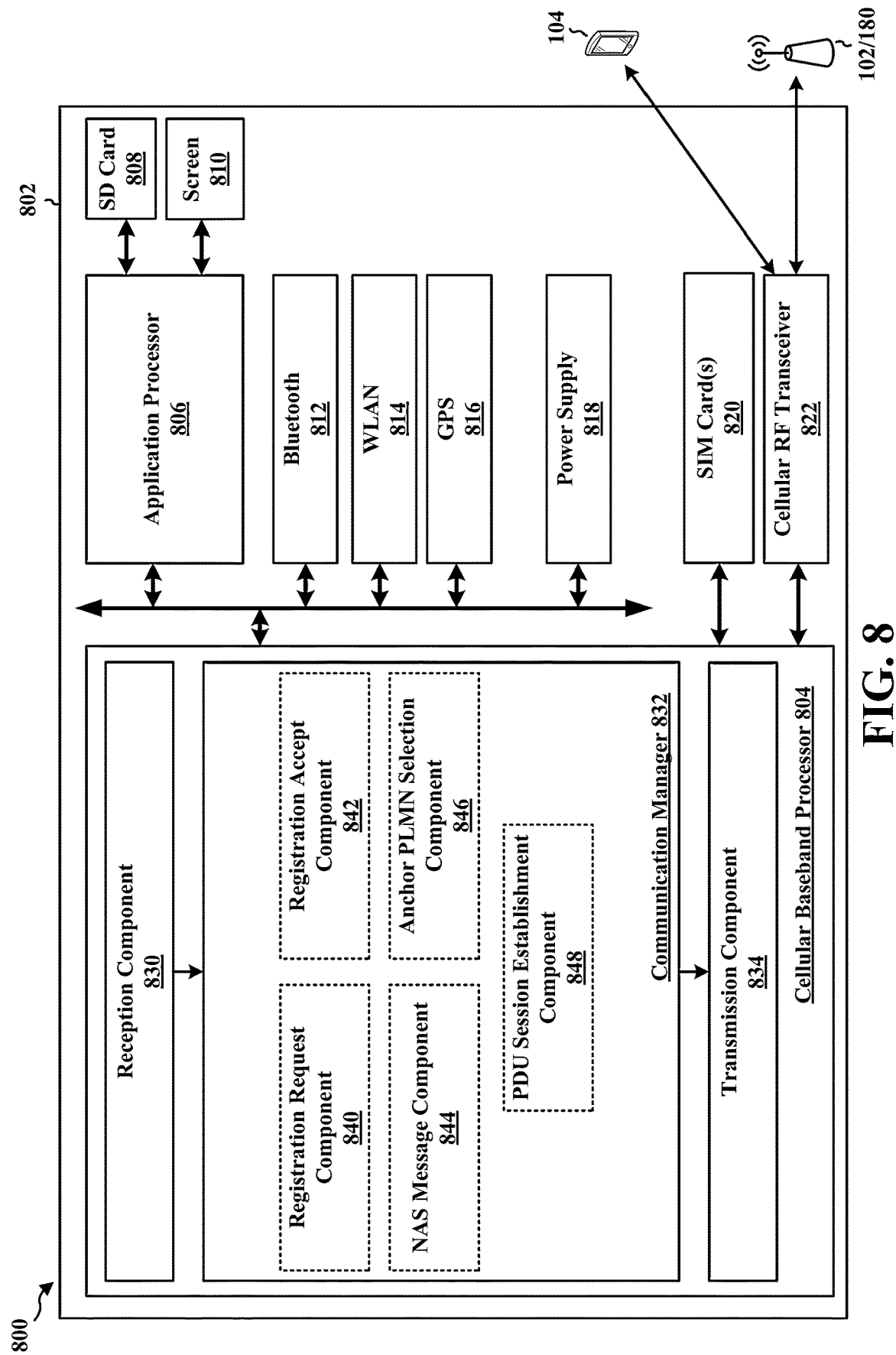
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a registration request component 840 that is configured to transmit a registration request to a base station of a first PLMN, where the registration request indicates a UE capability for a MA PDU session associated with a MUSIM device, the MA PDU session including a plurality of PDU sessions associated with a single access type, e.g., as described in connection with 702. The communication manager 832 further includes a registration accept component 842 that receives input in the form of the registration request from the registration request component 840 and is configured to receive a registration accept from the base station in response to the registration request, wherein the registration accept indicates a network capability for the MA PDU session associated with the MUSIM device, e.g., as described in connection with 704. The communication manager 832 further includes a NAS message component 844 that receives input in the form of the registration accept from the registration accept component 842 and is configured to receive a NAS message from the base station of the first PLMN, where the NAS message indicates a plurality of PLMNs supporting MA PDU sessions associated with the MUSIM device, e.g., as described in connection with 706. The communication manager 832 further includes an anchor PLMN selection component 846 that receives input in the form of the registration accept from the registration accept component 842 and is configured to select one of the first PLMN or the second PLMN as an anchor PLMN for the MA PDU session, e.g., as described in connection with 708. The communication manager 832 further includes a PDU session establishment component 848 that receives input in the form of the registration accept from the registration accept component 842 and is configured to transmit a PDU session establishment request for a first PDU session of the PDU sessions in the first PLMN and for a second PDU session of the PDU sessions in a second PLMN, where the first PLMN is associated with a first USIM of the UE, and the second PLMN is associated with a second USIM of the UE, e.g., as described in connection with 710.

The apparatus may include additional components that perform each of the blocks of the algorithm in the aforementioned flowcharts of FIGS. 6A-6B and 7. As such, each block in the aforementioned flowcharts of FIGS. 6A-6B and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for transmitting a registration request to a base station of a first public land mobile network (PLMN), wherein the registration request indicates a UE capability for a multi-access protocol data unit (MA PDU) session associated with a multiple universal subscriber identity module (MUSIM) device, the MA PDU session including a plurality of PDU sessions associated with a single access type; and wherein the means for transmitting is further configured to transmit a PDU session establishment request for a first PDU session of the PDU sessions in the first PLMN and for a second PDU session of the PDU sessions in a second PLMN, wherein the first PLMN is associated with a first USIM of the UE, and the second PLMN is associated with a second USIM of the UE.

In one configuration, the single access type may be Third Generation Partnership Project (3GPP) access.

In one configuration, the first PLMN may be associated with the first USIM in the registration request, the registration request including first information from the first USIM, and the second PLMN may be associated with the second USIM in a second registration request, the second registration request including second information from the second USIM, where the first information may comprise a first mobile subscriber identity and a first set of security credentials, and the second information may comprise a second mobile subscriber identity and a second set of security credentials.

In one configuration, the first PLMN may be a first home PLMN for the first USIM and the second PLMN may be a second home PLMN for the second USIM.

In one configuration, one of the first PLMN for the first USIM or the second PLMN for the second USIM may be a home PLMN.

In one configuration, the apparatus 802, and in particular the cellular baseband processor 804, may include means for receiving a registration accept from the base station in response to the registration request, wherein the registration accept indicates a network capability for the MA PDU session associated with the MUSIM device.

In one configuration, the apparatus 802, and in particular the cellular baseband processor 804, may include means for receiving a non-access-stratum (NAS) message from the base station of the first PLMN, wherein the NAS message indicates a plurality of PLMNs supporting MA PDU sessions associated with the MUSIM device.

In one configuration, the first USIM may store a plurality of PLMN identities of PLMNs supporting MA PDU sessions associated with the MUSIM device.

In one configuration, the apparatus 802, and in particular the cellular baseband processor 804, may include means for selecting one of the first PLMN or the second PLMN as an anchor PLMN for the MA PDU session. In one configuration, the anchor PLMN may be selected from a home PLMN for one of the first USIM or the second USIM. In one configuration, the anchor PLMN may be selected from an indicated PLMN in a non-access-stratum (NAS) message from the base station. In one configuration, the anchor PLMN may be selected from a PLMN identity stored in the first USIM. In one configuration, the PDU session establishment request may be transmitted in the anchor PLMN.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, aspects of the present disclosure provide a system to establish an MA PDU session over two 3GPP accesses respectively via different PLMNs associated with respective USIMs of a MUSIM device. For instance, during a registration procedure with a PLMN at a NAS protocol layer, the MUSIM UE may provide a capability indication to the network indicating device support for these MA PDU sessions over 3GPP access with different PLMNs, and the base station in the PLMN may similarly respond with a capability indication to the UE indicating network support for these MA PDU sessions over 3GPP access with different PLMNs. Moreover, after the base station in the registered PLMN (e.g., PLMN A) accepts registration with the MUSIM UE and determines the UE supports MA PDU sessions over 3GPP access with different PLMNs, the base station may provision the UE with a list of other PLMNs which similarly support these MA PDU sessions, and the UE may select one of these PLMNs as the anchor PLMN for the MA PDU session. As a result, the MUSIM UE may establish a MA PDU session over 3GPP access with the PLMNs to which the UE is connected, and the MUSIM device and anchor PLMN may perform ATSSS during the MA PDU session.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: transmitting a registration request to a base station of a first public land mobile network (PLMN), wherein the registration request indicates a UE capability for a multi-access protocol data unit (MA PDU) session associated with a multiple universal subscriber identity module (MUSIM) device, the MA PDU session including a plurality of PDU sessions associated with a single access type; and transmitting a PDU session establishment request for a first PDU session of the PDU sessions in the first PLMN and for a second PDU session of the PDU sessions in a second PLMN, wherein the first PLMN is associated with a first USIM of the UE, and the second PLMN is associated with a second USIM of the UE.

Example 2 is the method of Example 1, wherein the single access type is Third Generation Partnership Project (3GPP) access.

Example 3 is the method of Examples 1 or 2, wherein the first PLMN is associated with the first USIM in the registration request, the registration request including first information from the first USIM, and the second PLMN is associated with the second USIM in a second registration request, the second registration request including second information from the second USIM, and wherein the first information comprises a first mobile subscriber identity and a first set of security credentials, and the second information comprises a second mobile subscriber identity and a second set of security credentials.

Example 4 is the method of any of Examples 1 to 3, wherein the first PLMN is a first home PLMN for the first USIM and the second PLMN is a second home PLMN for the second USIM.

Example 5 is the method of any of Examples 1 to 3, wherein one of the first PLMN for the first USIM or the second PLMN for the second USIM is a home PLMN.

Example 6 is the method of any of Examples 1 to 5, further comprising: receiving a registration accept from the base station in response to the registration request, wherein the registration accept indicates a network capability for the MA PDU session associated with the MUSIM device.

Example 7 is the method of any of Examples 1 to 6, further comprising: receiving a non-access-stratum (NAS) message from the base station of the first PLMN, wherein the NAS message indicates a plurality of PLMNs supporting MA PDU sessions associated with the MUSIM device.

Example 8 is the method of any of Examples 1 to 7, wherein the first USIM stores a plurality of PLMN identities of PLMNs supporting MA PDU sessions associated with the MUSIM device.

Example 9 is the method of any of Examples 1 to 8, further comprising: selecting one of the first PLMN or the second PLMN as an anchor PLMN for the MA PDU session.

Example 10 is the method of Example 9, wherein the anchor PLMN is selected from a home PLMN for one of the first USIM or the second USIM.

Example 11 is the method of Example 9, wherein the anchor PLMN is selected from an indicated PLMN in a non-access-stratum (NAS) message from the base station.

Example 12 is the method of Example 9, wherein the anchor PLMN is selected from a PLMN identity stored in the first USIM.

Example 13 is the method of any of Examples 9 to 12, wherein the PDU session establishment request is transmitted in the anchor PLMN.

Example 14 is an apparatus for wireless communication, comprising: a processor; memory coupled with the processor; and instructions stored in the memory and operable, when executed by the processor, to cause the apparatus to: transmit a registration request to a base station of a first public land mobile network (PLMN), wherein the registration request indicates a UE capability for a multi-access protocol data unit (MA PDU) session associated with a multiple universal subscriber identity module (MUSIM) device, the MA PDU session including a plurality of PDU sessions associated with a single access type; and transmit a PDU session establishment request for a first PDU session of the PDU sessions in the first PLMN and for a second PDU session of the PDU sessions in a second PLMN, wherein the first PLMN is associated with a first USIM of the UE, and the second PLMN is associated with a second USIM of the UE.

Example 15 is the apparatus of Example 14, wherein the single access type is Third Generation Partnership Project (3GPP) access.

Example 16 is the apparatus of Examples 14 or 15, wherein the first PLMN is associated with the first USIM in the registration request, the registration request including first information from the first USIM, and the second PLMN is associated with the second USIM in a second registration request, the second registration request including second information from the second USIM, and wherein the first information comprises a first mobile subscriber identity and a first set of security credentials, and the second information comprises a second mobile subscriber identity and a second set of security credentials.

Example 17 is the apparatus of any of Examples 14 to 16, wherein the instructions, when executed by the processor, further cause the apparatus to: receive a registration accept from the base station in response to the registration request, wherein the registration accept indicates a network capability for the MA PDU session associated with the MUSIM device.

Example 18 is the apparatus of any of Examples 14 to 17, wherein the instructions, when executed by the processor, further cause the apparatus to: receive a non-access-stratum (NAS) message from the base station of the first PLMN, wherein the NAS message indicates a plurality of PLMNs supporting MA PDU sessions associated with the MUSIM device.

Example 19 is the apparatus of any of Examples 14 to 18, wherein the first

USIM stores a plurality of PLMN identities of PLMNs supporting MA PDU sessions associated with the MUSIM device.

Example 20 is the apparatus of any of Examples 14 to 20, wherein the instructions, when executed by the processor, further cause the apparatus to: select one of the first PLMN or the second PLMN as an anchor PLMN for the MA PDU session.

Example 21 is the apparatus of Example 20, wherein the anchor PLMN is selected from a home PLMN for one of the first USIM or the second USIM.

Example 22 is the apparatus of Example 20, wherein the anchor PLMN is selected from an indicated PLMN in a non-access-stratum (NAS) message from the base station.

Example 23 is the apparatus of Example 20, wherein the anchor PLMN is selected from a PLMN identity stored in the first USIM.

Example 24 is the apparatus of any of Examples 20 to 23, wherein the PDU session establishment request is transmitted in the anchor PLMN.

Example 25, an apparatus for wireless communication, comprising: means for transmitting a registration request to a base station of a first public land mobile network (PLMN), wherein the registration request indicates a UE capability for a multi-access protocol data unit (MA PDU) session associated with a multiple universal subscriber identity module (MUSIM) device, the MA PDU session including a plurality of PDU sessions associated with a single access type; and wherein the means for transmitting is further configured to transmit a PDU session establishment request for a first PDU session of the PDU sessions in the first PLMN and for a second PDU session of the PDU sessions in a second PLMN, wherein the first PLMN is associated with a first USIM of the UE, and the second PLMN is associated with a second USIM of the UE.

Example 26 is the apparatus of Example 25, wherein the first PLMN is associated with the first USIM in the registration request, the registration request including first information from the first USIM, and the second PLMN is associated with the second USIM in a second registration request, the second registration request including second information from the second USIM, and wherein the first information comprises a first mobile subscriber identity and a first set of security credentials, and the second information comprises a second mobile subscriber identity and a second set of security credentials.

Example 27 is the apparatus of Examples 25 or 26, further comprising: means for receiving a registration accept from the base station in response to the registration request, wherein the registration accept indicates a network capability for the MA PDU session associated with the MUSIM device.

Example 28 is the apparatus of any of Examples 25 to 27, further comprising: means for receiving a non-access-stratum (NAS) message from the base station of the first PLMN, wherein the NAS message indicates a plurality of PLMNs supporting MA PDU sessions associated with the MUSIM device.

Example 29 is the apparatus of any of Examples 25 to 28, further comprising: means for selecting one of the first PLMN or the second PLMN as an anchor PLMN for the MA PDU session.

Example 30 is a computer-readable medium storing computer executable code, the code when executed by a processor cause the processor to: transmit a registration request to a base station of a first public land mobile network (PLMN), wherein the registration request indicates a UE capability for a multi-access protocol data unit (MA PDU) session associated with a multiple universal subscriber identity module (MUSIM) device, the MA PDU session including a plurality of PDU sessions associated with a single access type; and transmit a PDU session establishment request for a first PDU session of the PDU sessions in the first PLMN and for a second PDU session of the PDU sessions in a second PLMN, wherein the first PLMN is associated with a first USIM of the UE, and the second PLMN is associated with a second USIM of the UE.

Example 31 is the method of Example 2, wherein the 3GPP access comprises New Radio (NR) access, Evolved Universal Terrestrial Radio Access (E-UTRA), or satellite access.

What is claimed is:

1. A method of wireless communication at a user equipment (UE), comprising:
    transmitting a registration request to a base station of a first public land mobile network (PLMN), wherein the registration request indicates: (i) a UE configuration as a multiple universal subscriber identity module (MUSIM) device, and (ii) a UE capability for a multi-access protocol data unit (MA PDU) session associated with multiple PLMNs, wherein the MA PDU session includes a plurality of PDU sessions, and wherein each of the plurality of PDU sessions is associated with a Third Generation Partnership Project (3GPP) access type;
    receiving, from the base station of the first PLMN, signalling configured to: (i) accept the registration request with the first PLMN, and (ii) provide the UE with an indication of a first PLMN capability for the MA PDU session;
    receiving, from the base station of the first PLMN, a list of multiple PLMNs including a second PLMN, wherein each of the multiple PLMNs supports the MA PDU session with the UE, wherein the first PLMN is associated with a first universal subscriber identity module (USIM) of the UE, and the second PLMN is associated with a second USIM of the UE; and
    selecting one of the first PLMN or the second PLMN as an anchor PLMN for the MA PDU session.

2. The method of claim 1, wherein the 3GPP access comprises New Radio (NR) access, Evolved Universal Terrestrial Radio Access (E-UTRA), or satellite access.

3. The method of claim 1,
    wherein the first PLMN is associated with the first USIM in the registration request, the registration request including first information from the first USIM, and the second PLMN is associated with the second USIM in a second registration request, the second registration request including second information from the second USIM, and
    wherein the first information comprises a first mobile subscriber identity and a first set of security credentials, and the second information comprises a second mobile subscriber identity and a second set of security credentials.

4. The method of claim 1, wherein the first PLMN is a first home PLMN for the first USIM and the second PLMN is a second home PLMN for the second USIM.

5. The method of claim 1, wherein one of the first PLMN for the first USIM or the second PLMN for the second USIM is a home PLMN.

6. The method of claim 1,
    wherein the list of multiple PLMNs is received via a non-access-stratum (NAS) message from the base station of the first PLMN.

7. The method of claim 1, further comprising: storing an indication of the multiple PLMNs.

8. The method of claim 1, wherein the anchor PLMN is selected from a home PLMN for one of the first USIM or the second USIM.

9. The method of claim 1, wherein the anchor PLMN is selected from a PLMN identity stored in the first USIM.

10. An apparatus for wireless communication, comprising:
    a processor;
    memory coupled with the processor; and
    instructions stored in the memory and operable, when executed by the processor, to cause the apparatus to:
        transmit a registration request to a base station of a first public land mobile network (PLMN), wherein the registration request indicates: (i) an apparatus configuration as a multiple universal subscriber identity module (MUSIM) device, and (ii) an apparatus capability for a multi-access protocol data unit (MA PDU) session associated with multiple PLMNs, wherein the MA PDU session includes a plurality of PDU sessions, and wherein each of the plurality of PDU sessions is associated with a Third Generation Partnership Project (3GPP) access type;
        receive, from the base station of the first PLMN, signalling configured to: (i) accept the registration request with the first PLMN, and (ii) provide the apparatus with an indication of a first PLMN capability for the MA PDU session;
        receive, from the base station of the first PLMN, a list of multiple PLMNs including a second PLMN, wherein each of the multiple PLMNs supports the MA PDU session with the apparatus, wherein the first PLMN is associated with a first universal subscriber identity module (USIM) of the apparatus, and the second PLMN is associated with a second USIM of the apparatus; and
        select one of the first PLMN or the second PLMN as an anchor PLMN for the MA PDU session.

11. The apparatus of claim 10,
    wherein the first PLMN is associated with the first USIM in the registration request, the registration request including first information from the first USIM, and the second PLMN is associated with the second USIM in a second registration request, the second registration request including second information from the second USIM, and
    wherein the first information comprises a first mobile subscriber identity and a first set of security credentials, and the second information comprises a second mobile subscriber identity and a second set of security credentials.

12. The apparatus of claim 10, wherein the list of multiple PLMNs is received via a non-access-stratum (NAS) message from the base station of the first PLMN.

13. The apparatus of claim 10, wherein the instructions, when executed by the processor, further cause the apparatus to: store an indication of the multiple PLMNs.

14. The apparatus of claim 10, wherein the anchor PLMN is selected from a home PLMN for one of the first USIM or the second USIM.

15. The apparatus of claim 10, wherein the anchor PLMN is selected from a PLMN identity stored in the first USIM.

16. An apparatus for wireless communication, comprising:
    means for transmitting a registration request to a base station of a first public land mobile network (PLMN), wherein the registration request indicates: (i) an apparatus configuration as a multiple universal subscriber identity module (MUSIM) device, and (ii) an apparatus capability for a multi-access protocol data unit (MA PDU) session associated with multiple PLMNs, wherein the MA PDU session includes a plurality of PDU sessions, and wherein each of the plurality of PDU sessions is associated with a Third Generation Partnership Project (3GPP) access type; and means for receiving, from the base station of the first PLMN, signalling configured to: (i) accept the registration request with the first PLMN, and (ii) provide the apparatus with an indication of a first PLMN capability for the MA PDU session;

wherein the means for receiving is further configured to receive, from the base station of the first PLMN, a list of multiple PLMNs including a second PLMN, wherein each of the multiple PLMNs supports the MA PDU session with the apparatus, wherein the first PLMN is associated with a first universal subscriber identity module (USIM) of the apparatus, and the second PLMN is associated with a second USIM of the apparatus; and means for selecting one of the first PLMN or the second PLMN as an anchor PLMN for the MA PDU session.

17. The apparatus of claim 16,
wherein the first PLMN is associated with the first USIM in the registration request, the registration request including first information from the first USIM, and the second PLMN is associated with the second USIM in a second registration request, the second registration request including second information from the second USIM, and
wherein the first information comprises a first mobile subscriber identity and a first set of security credentials, and the second information comprises a second mobile subscriber identity and a second set of security credentials.

18. The apparatus of claim 16,
wherein the list of multiple PLMNs is received via a non-access-stratum (NAS) message from the base station of the first PLMN.

19. A non-transitory computer-readable medium storing computer executable code, the code when executed by a processor causes the processor to:

transmit a registration request to a base station of a first public land mobile network (PLMN), wherein the registration request indicates: (i) a configuration as a multiple universal subscriber identity module (MUSIM) device, and (ii) a capability for a multi-access protocol data unit (MA PDU) session associated with multiple PLMNs, wherein the MA PDU session includes a plurality of PDU sessions, and wherein each of the plurality of PDU sessions is associated with a Third Generation Partnership Project (3GPP) access type;

receive, from the base station of the first PLMN, signalling configured to: (i) accept the registration request with the first PLMN, and (ii) provide an indication of a first PLMN capability for the MA PDU session;

receive, from the base station of the first PLMN, a list of multiple PLMNs including a second PLMN, wherein each of the multiple PLMNs supports the MA PDU session, wherein the first PLMN is associated with a first universal subscriber identity module (USIM), and the second PLMN is associated with a second USIM; and select one of the first PLMN or the second PLMN as an anchor PLMN for the MA PDU session.

* * * * *